US012504945B2

(12) United States Patent
Gossain et al.

(10) Patent No.: US 12,504,945 B2
(45) Date of Patent: Dec. 23, 2025

(54) RADIO COEXISTENCE TECHNIQUES FOR PLAYBACK DEVICES

(71) Applicant: Sonos, Inc., Santa Barbara, CA (US)

(72) Inventors: Hrishikesh Gossain, Santa Barbara, CA (US); Zhaoyun Huang, Sudbury, MA (US); Minho Cheong, Round Rock, TX (US)

(73) Assignee: Sonos, Inc., Goleta, CA (US)

( * ) Notice: Subject to any disclaimer, the term of this patent is extended or adjusted under 35 U.S.C. 154(b) by 291 days.

(21) Appl. No.: 18/355,134

(22) Filed: Jul. 19, 2023

(65) Prior Publication Data

US 2024/0020089 A1  Jan. 18, 2024

Related U.S. Application Data

(63) Continuation-in-part of application No. 17/833,224, filed on Jun. 6, 2022.

(60) Provisional application No. 63/369,117, filed on Jul. 22, 2022, provisional application No. 63/197,867, filed on Jun. 7, 2021.

(51) Int. Cl.
| | |
|---|---|
| *G06F 3/16* | (2006.01) |
| *H04W 4/80* | (2018.01) |
| *H04W 24/02* | (2009.01) |
| *H04W 84/18* | (2009.01) |

(52) U.S. Cl.
CPC ............ *G06F 3/165* (2013.01); *H04W 24/02* (2013.01); *H04W 4/80* (2018.02); *H04W 84/18* (2013.01)

(58) Field of Classification Search
CPC ......... G06F 3/165; H04W 24/02; H04W 4/80; H04W 84/18
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| (Continued) | | |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Fan S Tsang
(74) *Attorney, Agent, or Firm* — Finch & Maloney PLLC

(57) ABSTRACT

A playback device is provided. The device includes an interface. The interface includes a first radio to communicate in a first frequency range and a second radio to communicate in a second frequency range that at least partially overlaps with the first frequency range. The interface is configured to, after a determination that an operation is to be performed by one radio from the plurality of wireless radios, obtain a parameter. The parameter includes an indication of a protocol to be used in the operation. The interface is configured to determine a priority radio with reference to an interval associated with the first radio or the second radio and an amount of isochronous data to communicate within the interval. The interface is configured to determine whether to allow the one radio to perform the operation based on the at least one parameter and the priority radio.

18 Claims, 17 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0066227 | A1* | 3/2007 | Duerdodt ............... H04L 47/25 455/63.1 |
| 2007/0142944 | A1 | 6/2007 | Goldberg et al. |
| 2009/0176454 | A1* | 7/2009 | Chen ..................... H04B 15/00 455/63.1 |
| 2016/0196106 | A1* | 7/2016 | Hammer ................. H04R 3/12 381/79 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

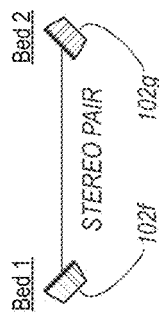
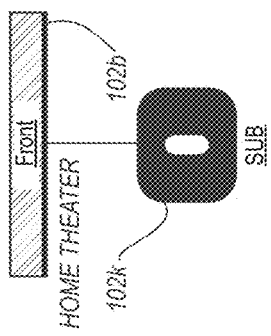
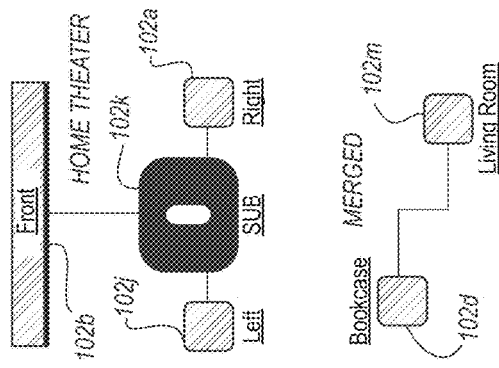
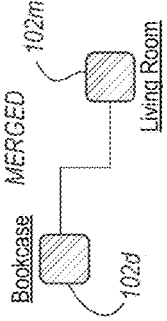
*Figure 3B*
*Figure 3C*
*Figure 3D*
*Figure 3E*
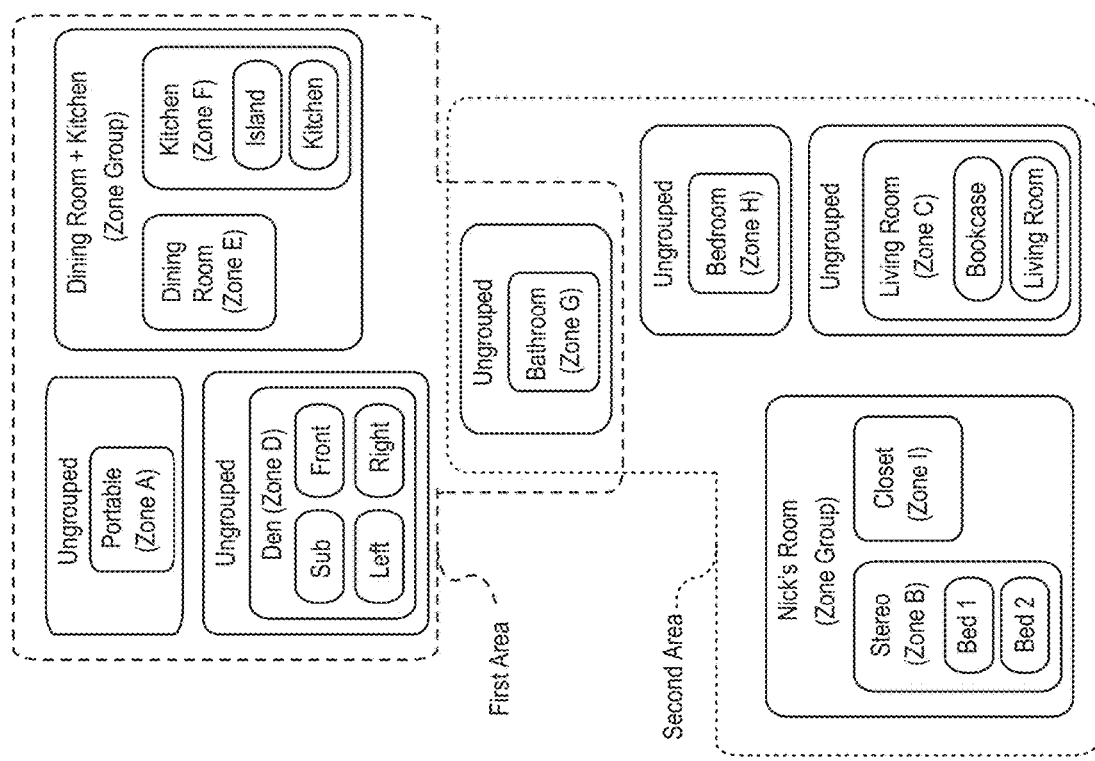
*Figure 3A*

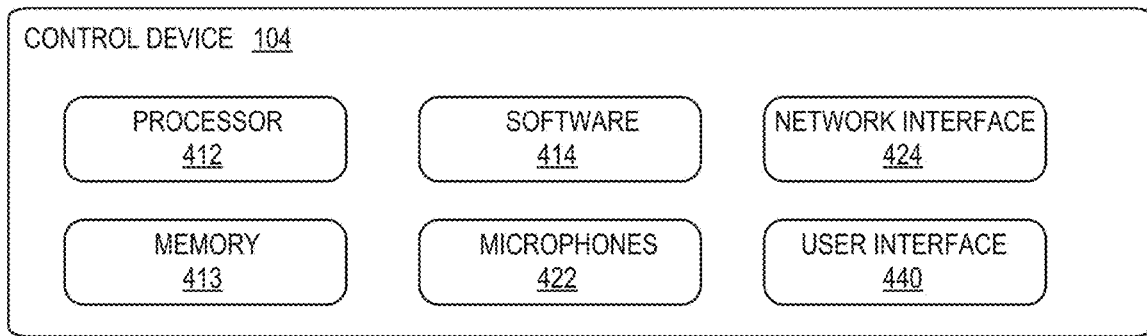
*Figure 4A*
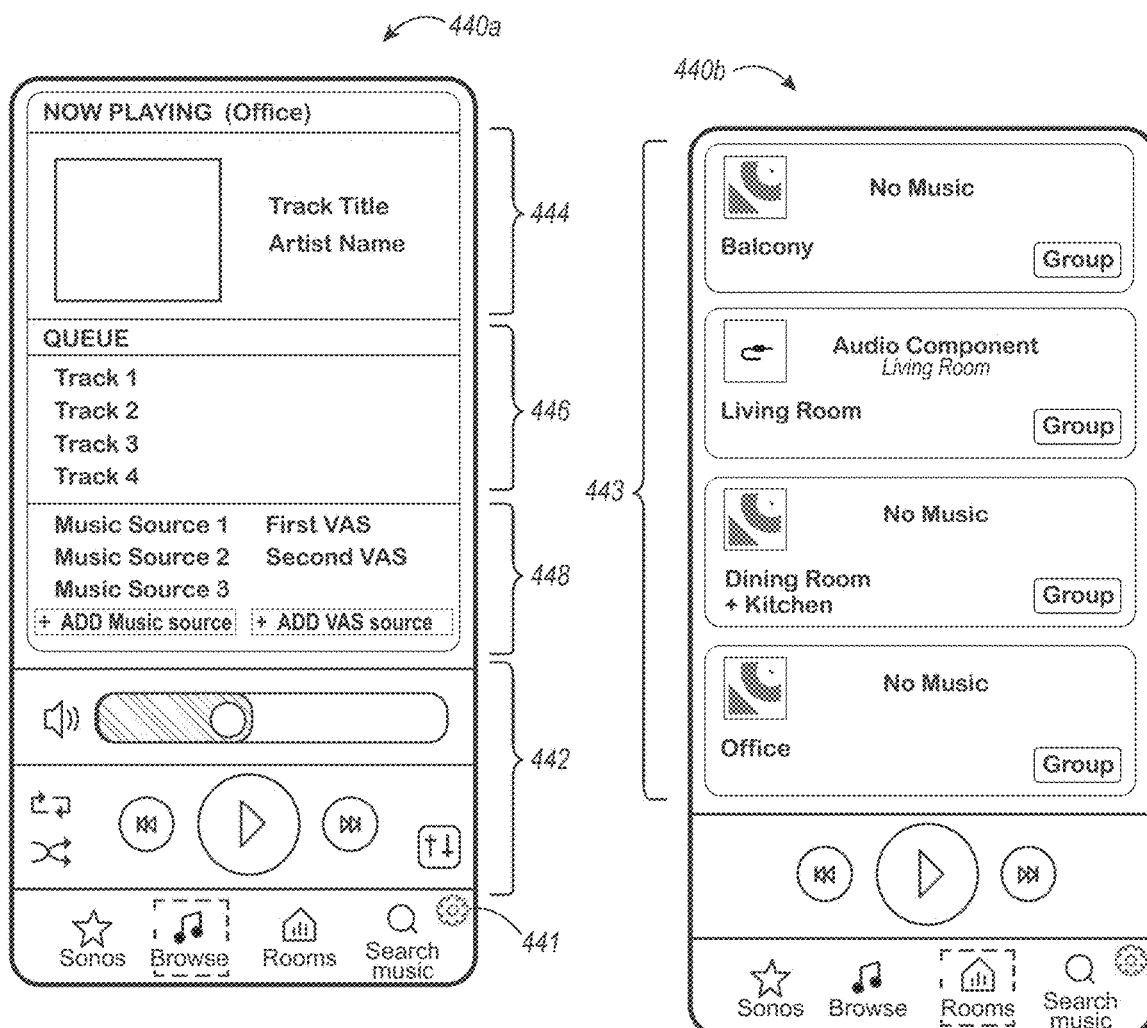
*Figure 4B*
*Figure 4C*

RADIO COEXISTENCE TECHNIQUES FOR PLAYBACK DEVICES

CROSS-REFERENCE TO RELATED APPLICATIONS

This application claims priority under 35 U.S.C. § 119(e) to U.S. provisional application Ser. No. 63/369,117, titled "RADIO COEXISTENCE TECHNIQUES FOR PLAYBACK DEVICES," filed Jul. 22, 2022. This application also claims benefit under 35 U.S.C. § 120 as a continuation-in-part of U.S. application Ser. No. 17/833,224, titled "RADIO COEXISTENCE TECHNIQUES FOR PLAYBACK DEVICES," filed Jun. 6, 2022, which claims priority under 35 U.S.C. § 119(e) to U.S. provisional application Ser. No. 63/197,867, titled "RADIO COEXISTENCE TECHNIQUES FOR PLAYBACK DEVICES," filed Jun. 7, 2021. Each of the aforementioned applications is hereby incorporated herein by reference in its entirety.

TECHNICAL FIELD

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIGS. 3A-3E are diagrams showing example playback device configurations in accordance with aspects of the disclosure.

FIG. 4A is a functional block diagram of an example controller device in accordance with aspects of the disclosure.

FIGS. 4B and 4C are controller interfaces in accordance with aspects of the disclosure.

Figure 1A:
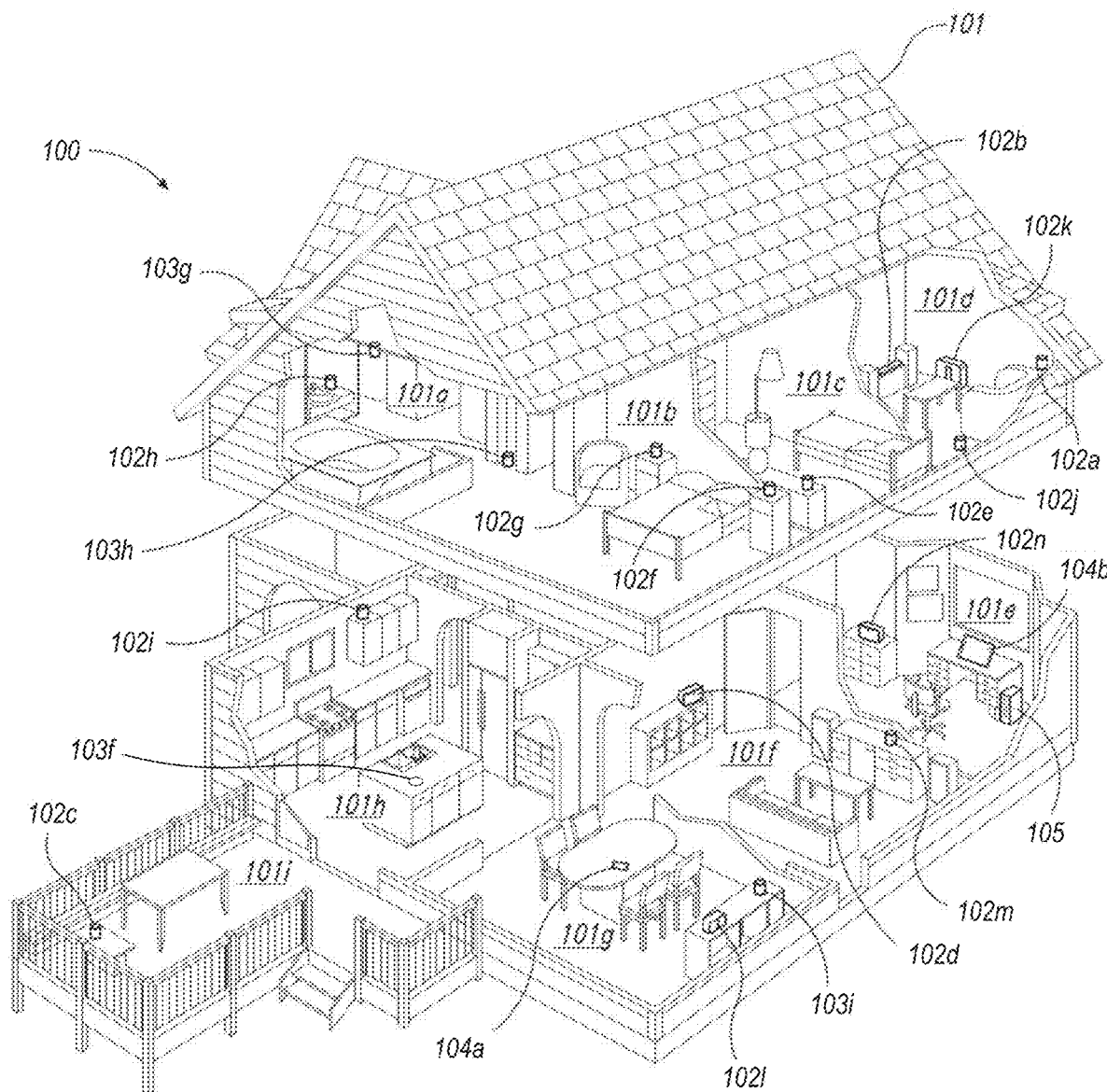
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Consumers expect modern electronic devices to communicate with an increasingly wide range of other devices across a variety of situations. For instance, consumers may expect to be able to control a playback device using a smartphone while at home (e.g., where the smartphone and the playback device are connected to a common wireless local area network (WLAN)), while at an outdoor picnic in a park (e.g., where the smartphone and the playback device are proximate each other but not connected to a common WLAN), and while at a friend's house (e.g., where the smartphone and the playback device may or may not be connected to a common WLAN and/or within proximity of each other). Accordingly, modern electronic devices include an increasing number of wireless radios to facilitate communication in such a wide variety of circumstances. Examples of such wireless radios include: Ultra-Wideband (UWB) radios, ZIGBEE radios, BLUETOOTH radios, WIFI radios (e.g., 2.4 Gigahertz (GHz) WIFI radios, 5 GHz WIFI radios, 6 GHz WIFI radios, or any combination thereof), and cellular radios (e.g., 4G radios, 5G radios, etc.).

Some wireless radios may communicate using overlapping portions of the wireless spectrum. For instance, the operating frequency range for a 2.4 GHz WIFI radio may at least partially overlap with the operating frequency range for a ZIGBEE radio and/or a BLUETOOTH radio. Additionally, the operating frequency range of a 6 GHz WIFI radio may at least partially overlap with the operating frequency range of a UWB radio. Simultaneous operation of multiple radios that communicate using overlapping frequency ranges may, undesirably, cause interference that can corrupt data. For example, a first wireless signal that is to be received by a first radio may be corrupted by a simultaneous transmission of a second wireless signal (in an overlapping frequency range) by a second radio. To avoid simultaneous operation of multiple wireless radios that have overlapping frequency ranges, some conventional wireless transceivers assign non-overlapping and fixed blocks of time to each of the radios for operation. During each of those fixed blocks of time, only the assigned radio is allowed to operate. For instance, a wireless transceiver with two wireless radios may alternatively allow each radio to operate for a fixed period of 10 milliseconds.

SONOS, Inc. has appreciated that conventional approaches for handling radio coexistence, while avoiding undesirable interference, introduce several problems that may degrade performance (e.g., increase latency, reduce bandwidth, etc.) of the radios. In particular, such conventional coexistence techniques can substantially degrade performance when employed with radios that use an Automatic Repeat Request (ARQ) scheme, such as WIFI radios (e.g., for certain transmissions). In an ARQ scheme, the sender of data may re-transmit that data when the data is not successfully received by the designated recipient. For instance, in the ARQ scheme employed by WIFI radios, a first WIFI radio may transmit a set of packets to a second WIFI radio and wait for one of the following events to occur: (1) receipt of an Acknowledge (ACK) from the second WIFI radio indicating that set of packets was successfully received by the second WIFI radio; (2) receipt of a Negative Acknowledgement (NACK) indicating that the set of packets was not successfully received by the second WIFI radio (e.g., the second WIFI radio detected an error, such as a cyclic redundancy check (CRC) error, in a packet); or (3) a timer expires without receipt of an ACK or NACK (e.g., inferring that the second WIFI radio did not receive the packets at all). After receipt of an ACK, the first WIFI radio may transmit the next set of packets to the second WIFI radio. Conversely, after receipt of the NACK or the timer expiration, the first WIFI radio may re-transmit the set of one or more packets to the second WIFI radio. When such an ARQ scheme is combined with conventional approaches for handling radio coexistence, the ACK transmission by the second WIFI radio may be considerably delayed in certain situations. Such a delay of the ACK transmission may undesirably cause either: (1) delay of the transmission of subsequent packets by the first WIFI radio (e.g., as the first WIFI radio waits for the ACK); or (2) the timer to expire causing the first WIFI radio to re-transmit one or more packets to the second WIFI radio even when the second WIFI radio already successfully received those packets.

Figure 10:
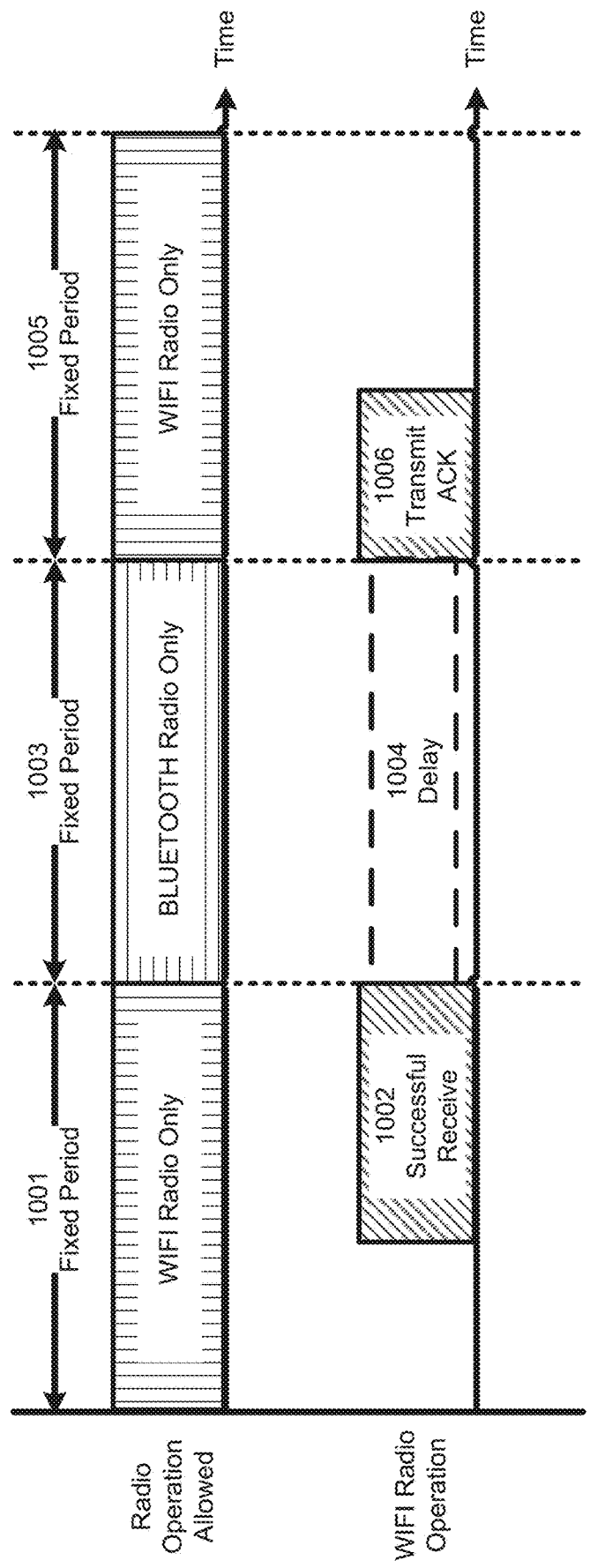
FIG. 10 is a diagram depicting an example transmission delay.

FIG. 10 depicts an example of such a delay in transmission of an ACK after successful receipt of a packet in a wireless transceiver comprising a 2.4 GHz WIFI radio and a BLUETOOTH radio. The wireless transceiver assigns each of the 2.4 GHz WIFI radio and the BLUETOOTH radio fixed slots of time to operate that are interposed (e.g., alternate). Each of these time slots are the same length and fixed (i.e., the duration of these time slots never changes). As shown in FIG. 10, the 2.4 GHz WIFI radio is only allowed to operate in first and third fixed periods 1001 and 1005, respectively, while the BLUETOOTH radio is only allowed to operate in the second fixed period 1003. In such a scheme, the 2.4 GHz WIFI radio may successfully receive a packet (shown as successful receive 1002) and must wait a considerable amount of time before transmitting the ACK (shown as transmit ACK 1006) to the sender. In particular, the successful receive 1002 may occur near the end of the first fixed period 1001 and the 2.4 GHz WIFI radio may need to wait until the third fixed period 1005 to transmit the ACK 1006 (e.g., because the WIFI radio is not allowed to operate during the second fixed period 1003). As a result, transmission of the ACK 1006 is delayed by an amount of time (shown as delay 1004) that is at least as long as the entire second fixed period 1003. Such a long delay undesirably degrades the performance of the 2.4 GHz WIFI radio (e.g., substantially increases latency and reduces throughput) at least because the sending radio may wait for the ACK before transmitting the next set of packets. Worse yet, the sending radio may reach the time out condition if the delay 1004 is too long and retransmit the same packets to the 2.4 GHz WIFI radio despite the WIFI radio having already successfully received those packets.

Accordingly, aspects of the present disclosure relate to radio coexistence techniques that, while still avoiding substantial interference, mitigate (and/or eliminate) the performance degradation of conventional approaches (such as increased latency, reduced bandwidth, etc.). In some examples, a more flexible coexistence scheme is described herein that may dynamically adjust the duration of time slots allocated to various radios for operation and/or strategically allow simultaneous operation in situations where interference is unlikely. In such a flexible coexistence scheme, one or more parameters (e.g., indicative of a current or near future operating scenario) may be employed to dynamically make such time slot adjustments and/or allow simultaneous operation. Examples of such parameters that may be employed include: (1) a duty cycle (e.g., fraction of time spent operating) of a radio (e.g., allocate more time (and/or opportunity to operate) to the radio with a higher duty cycle and/or allocate less time (and/or opportunity to operate) to the radio with a lower duty cycle); (2) a protocol to be employed in an operation that is to be performed (e.g., BLE operations may require a different amount of time to perform than a BLUETOOTH classic operation); (3) an antenna isolation between antennas associated with the respective radios (e.g., allow simultaneous operations in situations where the amount of isolation between the antennas is sufficient to avoid interference); (4) received signal strength (e.g., receives signal strength indicator (RSSI)) associated with prior communication with the target device in the request (e.g., if the signal strength is high, the target device is likely close and the power level of transmission to that target device may be lowered such that simultaneous operation can occur without substantial interference); (5) power level associated with an operation that is be performed (e.g., allow simultaneous operations in situations where the power levels of any transmit operations are sufficiently low to avoid interference); (6) a priority of the operation that is to be performed (e.g., prioritize certain operations, such as ACK transmissions); and (7) an amount of isochronous data to communicate within an interval associated with a radio.

In some examples, one or more of the radios described herein may be configured to terminate operations early (e.g., before the operation is completed). For instance, in radios that support certain 802.11-based protocols, information may be incorporated into a packet (e.g., in one or more of: a preamble (e.g., PHY preamble) of a packet, a header (e.g., MAC header) of a packet, or a payload of a packet) that may be employed during a receive operation to determine whether the packet originated from a relevant network (e.g., from a network the radio is connected to) or another network (e.g., from a network the radio is not connected to). Examples of such information include Basic Service Set (BSS) color information in an 802.11ax packet, GROUP ID information in an 802.11ac+ packet, association ID of the STA, number of spatial streams and bandwidth, MAC address of the STA, traffic type and priority information, power saving urgency-related information, Wi-Fi generation indication of the packet, and/or any other STA-related information in an 802.11 packet. In instances where the packet is deemed to have originated from another network based on information in the packet, the radio may stop the receive operation for that packet (e.g., and ignore any information in a payload of the packet).

Such early termination of an operation may, in some implementations, be advantageously leveraged in the flexible coexistence techniques described herein. In particular, a radio in a wireless transceiver that is able to terminate an operation early may inform other portions of the wireless transceiver such that the wireless transceiver can grant another request (e.g., from another radio) earlier than otherwise possible. For example, a radio may generate a first request to perform a receive operation that is expected to take a specified amount of time. After this request is granted, the radio may determine that the receive operation can be terminated early (e.g., before expiration of the specified amount of time). In this instance, the radio may generate a second request to terminate the operation early (and/or a notification that the radio is to/did terminate the operation early). As a result, the wireless transceiver can grant a request for another operation before expiration of the specified amount of time (e.g., even in situations where that other operation would have interference with the receive operation).

It should be appreciated that the techniques described herein may be advantageously employed in any of a variety of contexts involving coordination of multiple radios. In the context of playback devices, such techniques may be advantageously employed in scenarios where audio is received by a playback device via a first network and communicated to other playback devices using a second network. One such example is BLUETOOTH Line-In where a first playback device receives an audio stream over a BLUETOOTH network (e.g., using a BLUETOOTH Classic protocol from a smartphone) and (while receiving the audio stream) transmits at least some audio content from the received audio stream to a second playback device over another network, such as a 2.4 GHz WIFI network (e.g., for playback by the second playback device alone or in synchrony with another playback device such as the first playback device). Another such example is BLUETOOTH Line-Out where a first playback device receives an audio stream over a network other than a BLUETOOTH network, such as a 2.4 GHz WIFI network, and (while receiving the audio stream) transmits at least some audio content from the received audio stream to a second playback device over a BLUETOOTH network (e.g., for playback by the second playback device alone or in synchrony with another playback device such as the first playback device). In each of the BLUETOOTH Line-In and BLUETOOTH Line-Out examples, the second playback device may playback the audio alone (e.g., the first playback device is muted or otherwise not rendering audio) or in synchrony with the first playback device (e.g., the first and second playback devices are rending the audio in synchrony). Additional details regarding features for playback devices that may involve simultaneous operation of multiple radios, such as BLUETOOTH Line-In and/or BLUETOOTH Line-Out, are described in International Publication No. WO 2021/050546 (hereinafter "'546 publication") published Mar. 18, 2021, and titled "Synchronizing Playback of Audio Information Received from Other Networks," which is hereby incorporated herein by reference in its entirety.

Figure 11:
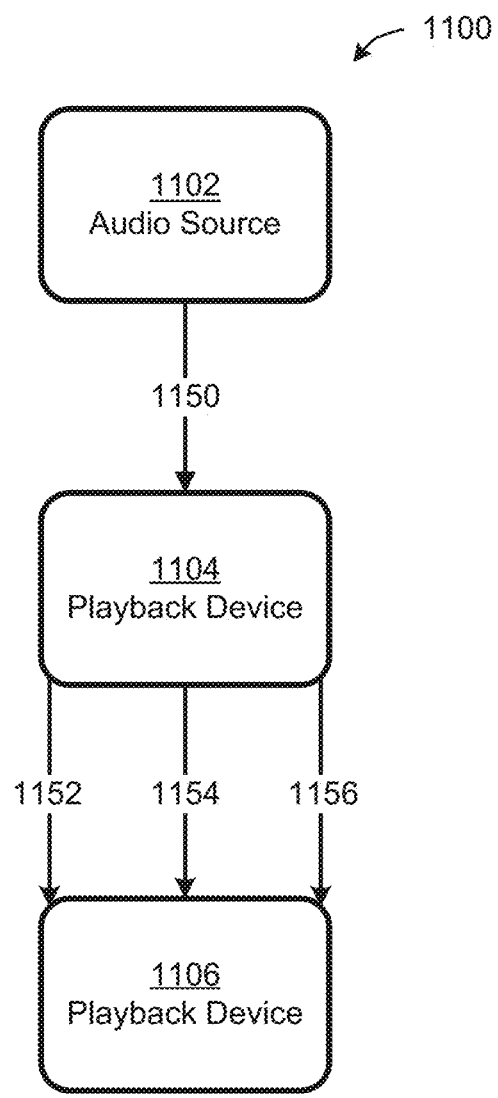
FIG. 11 is a diagram depicting an example configuration of playback devices in accordance with aspects of the disclosure.

An example configuration 1100 of an audio source and two playback devices showing a possible implementation of BLUETOOTH Line-In and/or BLUETOOTH Line-Out, as described and depicted herein and in the '546 publication, is shown in FIG. 11. In particular, the configuration 1100 includes a first playback device 1104, a second playback device 1106, and an audio source 1102. The arrows 1150, 1152, 1154, and 1156 shown in configuration 1100 indicate signal flow for timing information and/or audio content. Playback devices 1104 and 1106 may be the same as or similar to any of the playback devices shown and described herein. The first playback device 1104 and the second playback device 1106 may be configured in a synchrony group, where the first playback device 1104 and the second playback device 1106 play audio content in synchrony with each other. Additionally (or alternatively), the first playback device 1104 and the second playback device 1106 may be configured in a bonded group (e.g., a stereo pair) where the first playback device 1104 is configured to play a first subset of frequency components of the audio content (e.g., a left channel of stereo audio content) and the second playback device 1106 is configured to play a second subset of frequency components of the audio content (e.g., a right channel of stereo audio content).

In operation, within the configuration 1100 shown in FIG. 11, the source 1102 transmits a stream of data including packets of encoded audio information 1150 to the first playback device 1104 via a BLUETOOTH wireless link (e.g., during BLUETOOTH Line-In operation) or a WIFI wireless link (e.g., during BLUETOOTH Line-Out operation). In some embodiments, the stream of data is organized into frames or cells of audio information 1150. In some embodiments, the stream of data is packaged into other formats and, as such, the embodiments described herein are not limited to a particular package format and may subscribe to formats now known or later developed that are suitable for transmitting data.

Within the configuration 1100, the first playback device 1104 is the "sourcing" playback device for the first audio content 1150 and, in some embodiments, operates as a group coordinator for the group made up of the first playback device 1104 and the second playback device 1106. The group in example 1100 is shown as including only the first playback device 1104 and the second playback device 1106. In operation, the group can include more than two playback devices.

In operation, the first playback device 1104 (i) receives audio information 1150 from the audio source 1102 via a communications link between the audio source 1102 and the first playback device 1104, (ii) provides audio information 1152 to the second playback device 1106 (and possibly additional playback devices (not shown)), and (iii) plays audio content based on the audio information 1150 in synchrony with the second playback device 1106 (and possibly additional playback devices (not shown)).

In some implementations, the first playback device 1104 receives the stream of packets comprising the encoded audio information 1150 from the source 1102 and extracts the encoded audio information 1150 from the incoming stream on a packet-by-packet basis. In these implementations, when the first playback device 1104 receives a first packet comprising the encoded audio information 1150 from the source 1102, the first playback device 1104 extracts the portion(s) of encoded audio information 1150 contained within that packet. The first playback device 1104 continues to extract the encoded audio information 1150 from the packets as they arrive (or substantially as they arrive) on a packet-by-packet basis (or frame-by-frame or cell-by-cell, depending on how the encoded audio information 1150 is packaged).

In certain implementations, while the first playback device 1104 continues to receive the first stream of data comprising the encoded audio information 1150 (e.g., an incoming stream) and to extract the encoded audio information 1150 from the incoming stream, the first playback device 1104 generates and transmits a second stream of data (e.g., an outgoing stream) comprising portions of extracted audio information 1152 to at least the second playback device 1106 (and perhaps also to additional playback devices (not shown)). Within the configuration 1100, the first playback device 1104 transmits the second stream (the outgoing stream) including portions of extracted audio information 1152 to the second playback device 1106 via a WIFI wireless link (e.g., during BLUETOOTH Line-In operation) or via a BLUETOOTH wireless link (e.g., during BLUETOOTH Line-Out operation). In some embodiments, the first playback device 1104 (i) receives the incoming stream from the audio source 1102 via a first wireless interface, and (ii) transmits the outgoing stream to at least the second playback device 1106 via a second wireless interface that is different than the first wireless interface.

In some examples of the configuration 1100, because BLUETOOTH and WIFI are different transmission protocols, the outgoing stream has a different framing format than the incoming stream. As such, in these examples, the first playback device 1104 (i) receives audio information 1150 via an incoming data stream which has a first framing format (e.g., BLUETOOTH), and (ii) generates and transmits audio information 1152 to one or more other playback devices via an outgoing stream which has a second framing format (e.g., WIFI).

In certain examples, the outgoing stream includes (i) portions of the encoded audio information extracted from the incoming stream and (ii) playback timing information. The playback timing information specifies playback timing for the portions of the encoded audio information extracted from the incoming stream. In some embodiments, the outgoing stream may additionally include clock timing information. In some embodiments, however, the first playback device 1104 may transmit clock timing information to the second playback device 1106 separately from the outgoing stream.

In particular, in addition to the portions of audio information 1152, in some examples the first playback device 1104 also transmits playback timing 1154 for the portions of the audio information 1152 and clock timing 1156 to the second playback device 1106 (and perhaps additional playback devices (not shown)). In operation, the second playback device 1106 uses the playback timing 1154 and the clock timing 1156 to play audio content based on the audio information 1152 in synchrony with at least the first playback device 1104.

In some embodiments, the first playback device 1104 generates the playback timing 1154 for the audio information 1152 by adding a "timing advance" to a current clock time of the local reference clock that the first playback device 1104 uses for generating the playback timing 1154 for the audio information 1152. In some embodiments, the playback timing 1154 for a frame or packet of audio information 1152 corresponds to a future time, relative to a reference clock time, that the portion(s) audio information 1152 in the packet (or frame) is to be played.

In some implementations, after determining the playback timing 1154 for a packet, frame, and/or sample of the audio information 1152, the first playback device 1104 transmits the packet/frame/sample of audio information 1152 and the first playback timing 1154 for the packet/frame/sample of audio information 1152 to the second playback device 1106. Because in the configuration 1100, the first playback device 1104 uses its own local clock timing to generate the playback timing 1154 for the audio information 1152, the first playback device 1104 also transmits its clock timing 1156 to the second playback device 1106.

The second playback device 1106 uses the clock timing 1156 of the first playback device 1104 and the second playback device's 1106 own clock timing to generate a "timing offset." Because the second playback device 1106 uses the playback timing 1154 and the clock timing 1156 received from the first playback device 1104 to play the audio information 1152, the second playback device 1106 in this instance uses remote playback timing and remote clock timing to play audio content based on the audio information 1152 in synchrony with the first playback device 1104.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
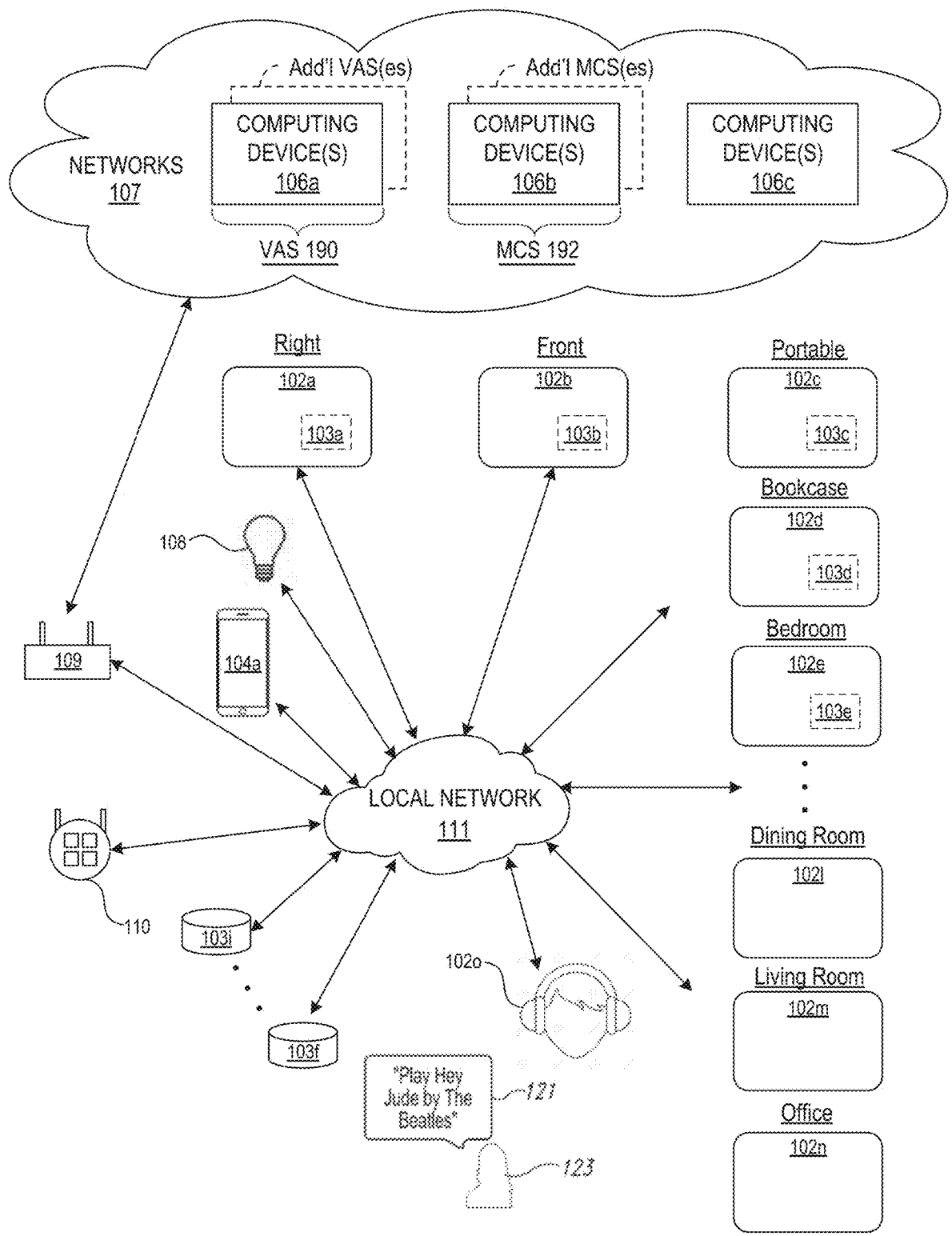
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

a. Example Playback & Network Microphone Devices

Figure 2A:
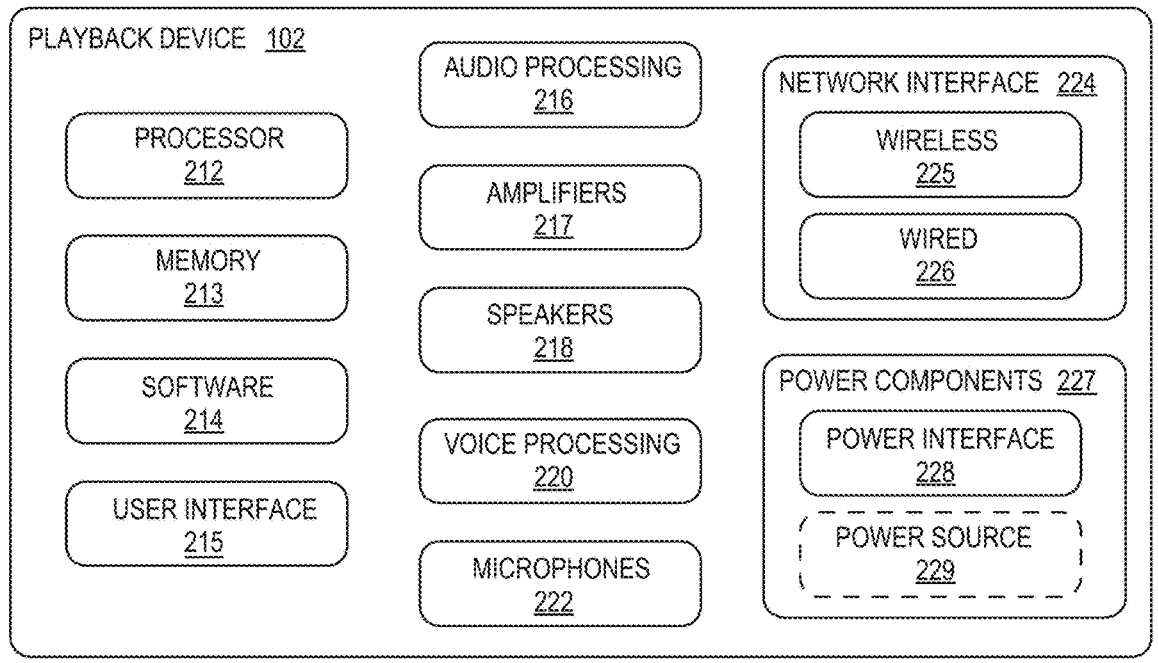
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audiovisual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Patent Publication No. 2017-0242653.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 215 that may facilitate user interactions independent of or in conjunction with user interactions facilitated by one or more of the controller devices 104. In various embodiments, the user interface 215 includes one or more physical buttons and/or supports graphical interfaces provided on touch sensitive screen(s) and/or surface(s), among other possibilities, for a user to directly provide input. The user interface 215 may further include one or more of lights (e.g., LEDs) and the speakers to provide visual and/or audio feedback to a user.

Figure 2B:
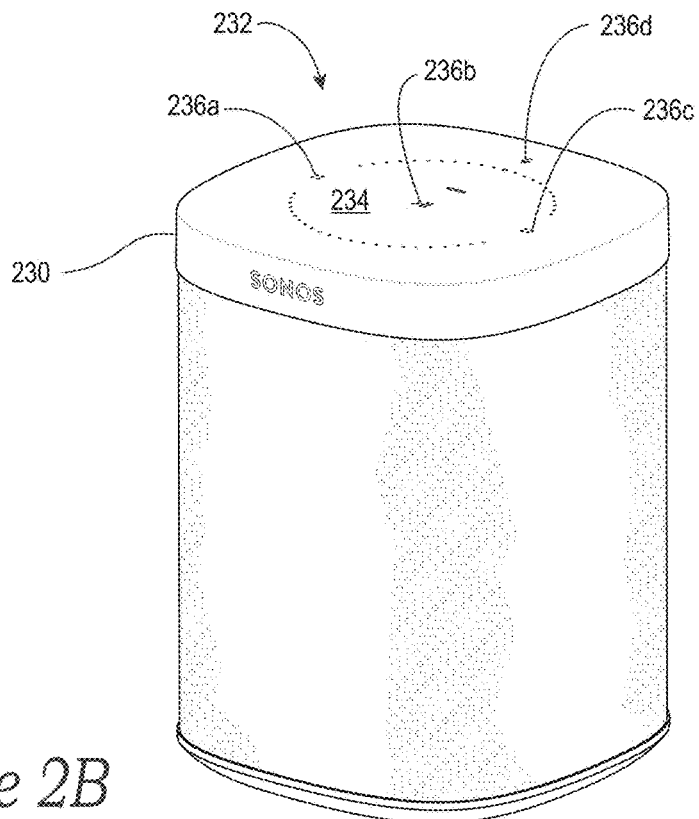
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
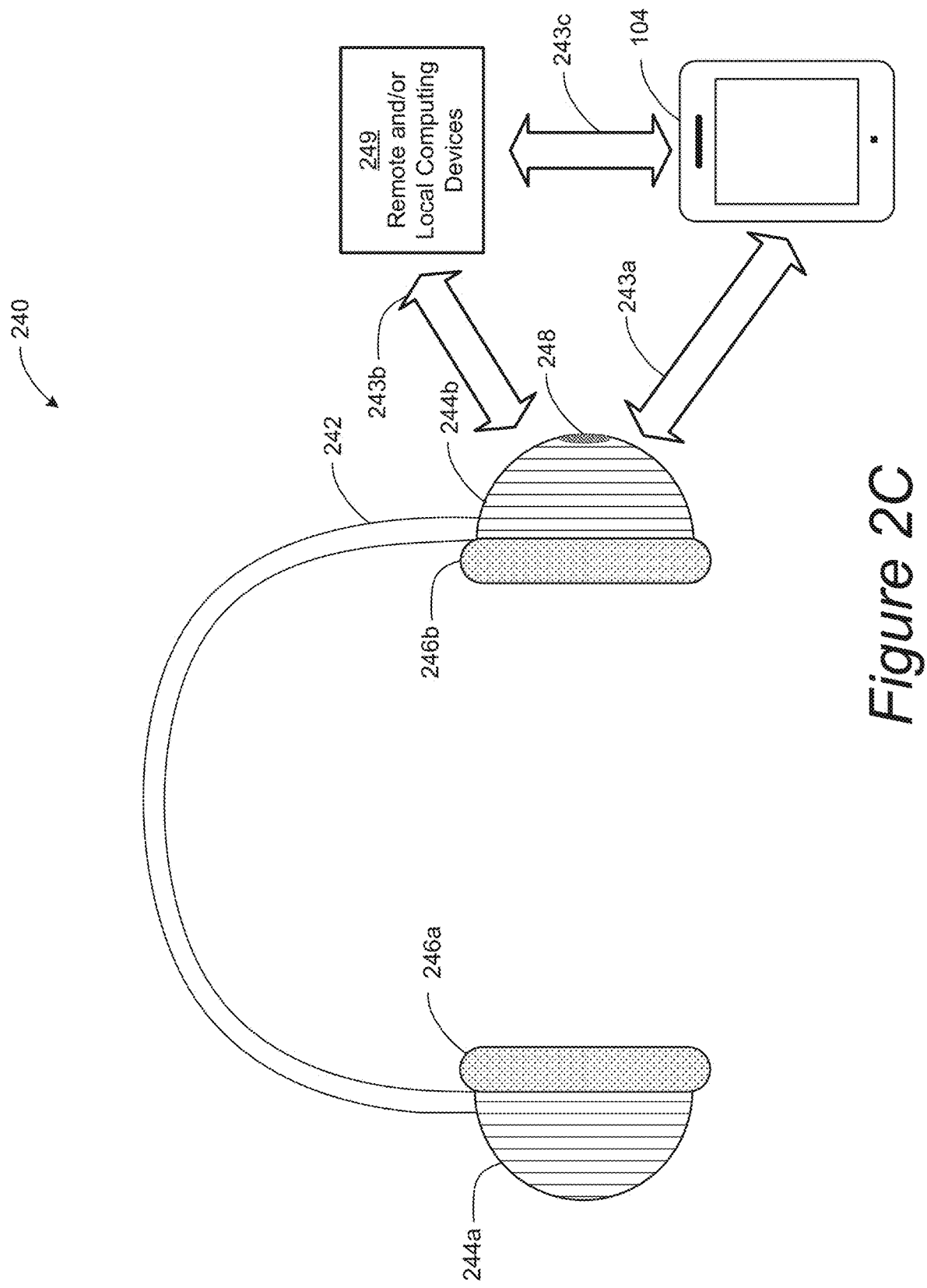
FIG. 2C is a diagram of an example headset assembly for the playback device of FIG. 2A.

In some embodiments, the playback device 102 may take the form of a wired and/or wireless headphone (e.g., an over-ear headset, an on-ear headset, or an in-ear headset). For instance, FIG. 2C shows an example headset assembly 240 ("headset 240") for such an implementation of the playback device 102. As shown, the headset 240 includes a headband 242 that couples a first earcup 244a to a second earcup 244b. Each of the earcups 244a and 244b may house any portion of the electronic components in the playback device 102, such as one or more speakers. Further, one or more of the earcups 244a and 244b may include a user interface for controlling audio playback, volume level, and other functions. The user interface may include any of a variety of control elements such as a physical button 248, a slider, a knob, and/or a touch control surface. As shown in FIG. 2C, the headset 240 may further include ear cushions 246a and 246b that are coupled to earcups 244a and 244b, respectively. The ear cushions 246a and 246b may provide a soft barrier between the head of a user and the earcups 244a and 244b, respectively, to improve user comfort and/or provide acoustic isolation from the ambient (e.g., passive noise reduction (PNR)).

As described in greater detail below, the electronic components of a playback device may include one or more network interface components (not shown in FIG. 2C) to facilitate wireless communication over one more communication links. For instance, a playback device may communicate over a first communication link 243a (e.g., a BLUETOOTH link) with one of the controller devices 104 and/or over a second communication link 243b (e.g., a WI-FI or cellular link) with one or more other computing devices 249 (e.g., a network router and/or a remote server). As another possibility, a playback device may communicate over multiple communication links, such as the first communication link 243a with the controller device 104 and a third communication link 243c (e.g., a Wi-Fi or cellular link) between the controller device 104 and the one or more other computing devices 249. Thus, the controller device 104 may function as an intermediary between the playback device and the one or more other computing devices 249, in some embodiments.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

By way of illustration, SONOS, Inc. presently offers (or has offered) for sale certain playback devices that may implement certain of the embodiments disclosed herein, including a "SONOS ONE," "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A, 2B, or 2C or to the SONOS product offerings. For example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone.

For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101b (FIG. 1A) and the Bed 2 device may be the playback device 102g also in the master bedroom 101b (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a navigation region 441, a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. Example Radio Coexistence Techniques for Playback Devices

Figure 5:
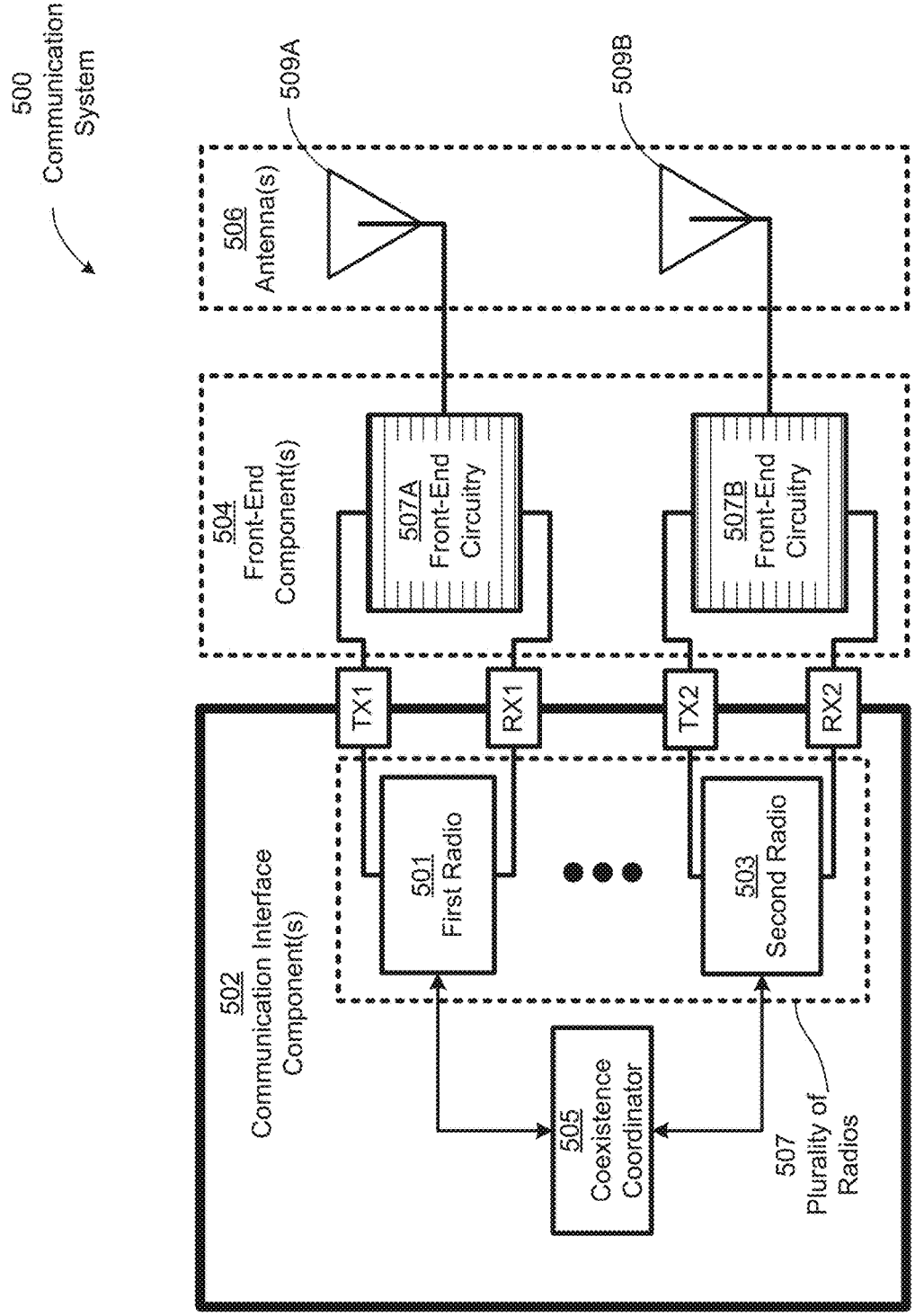
FIG. 5 is a functional block diagram of an example communication system employing radio coexistence techniques in accordance with aspects of the disclosure.

As discussed above, radio coexistence techniques that are more flexible (e.g., taking into account various parameters indicative of the particular situation) may be advantageously employed to coordinate operation of multiple radios to mitigate (and/or eliminate) the performance degradation of conventional approaches (such as increased latency, reduced bandwidth, etc.). An example communication system that employs the radio coexistence techniques described herein is shown in FIG. 5 by communication system 500. The communication system 500 may be implemented in any of a variety of devices including any of the devices described herein. Examples of such devices into which the communication system 500 may be incorporated include computing devices, Internet-of-Things (IoT) devices, playback devices, and NMDs.

As shown in FIG. 5, the communication system 500 comprises communication interface component(s) 502 including a plurality of radios 507 (including a first radio 501 and a second radio 503) and a coexistence coordinator 505 that coordinates operation of at least some of the plurality of radios 507. Each of the plurality of radios may be configured to facilitate communication with external devices using a respective set of one or more communication protocols. The communication system 500 further comprises front-end component(s) 504 that may be coupled between the communication interface component(s) 502 and antenna(s) 506. The front-end component(s) 504 may include front-end circuitry 507A coupled between the transmit and receive terminals associated with the first radio 501 (shown as terminals TX1 and RX1, respectively) and at least one antenna 509A. The front-end component(s) 504 may further include front-end circuitry 507B coupled between the transmit and receive terminals associated with the second radio 503 (shown as terminals TX2 and RX2, respectively) and at least one antenna 509B.

The communication interface component(s) 502 may be configured to facilitate wireless communication with external devices via a plurality of communication protocols. For example, the communication interface component(s) 502 may be configured to facilitate communication via at least two of: an 802.11-based protocol, a BLUETOOTH protocol (e.g., a BLUETOOTH classic protocol or a BLE protocol), or a ZIGBEE protocol. To facilitate such communication using a plurality of protocols, the communication interface component(s) 502 may comprise the plurality of radios 507 each configured to facilitate communication using a set of one or more communication protocols.

The first radio 501 may be configured to facilitate communication using a first set of one or more protocols and the second radio 503 may be configured to facilitate communication using a second set of one or more protocols that is different from the first set of one or more protocols. For example, the first radio 501 may comprise a WIFI radio configured to communicate using at least one 802.11 based protocol and the second radio 503 may comprise a BLUETOOTH radio configured to communicate using at least one BLUETOOTH protocol. The first and second radios 501 and 503, respectively, may be coupled to external components (e.g., front-end component(s) 504) using a plurality of terminals. For instance, the first radio 501 may be coupled to front-end circuitry 507A via a transmit terminal (shown as TX1) and/or a receive terminal (shown as RX1) while the second radio 503 may be coupled to front-end circuitry 507B via a transmit terminal (shown as TX2) and/or a receive terminal (shown as RX2).

The first and second radios 501 and 503, respectively, may each be configured to generate a request or notification regarding at least some operations (e.g., at least some transmit and/or receive operations) that are to be performed and provide (e.g., transmit or otherwise make available) the request or notification to the coexistence coordinator 505. In some instances, the first radio 501 and/or the second radio 503 may wait to perform the operation until allowed by the coexistence coordinator 505. For example, a radio may have data queued in a transmit buffer and, after detecting data in the transmit buffer, generate a request to perform a transmit operation, provide the request to the coexistence coordinator 505, and wait to perform the transmit operation until the coexistence coordinator 505 allows the operation. In another example, a radio may need to perform (or modify an existing) operation, generate a notification that the radio is going to perform the operation, provide the notification to the coexistence coordinator 505, and proceed to perform the operation (e.g., without waiting for a response from the coexistence coordinator).

In some examples, the first radio 501 and/or the second radio 503 may be configured to perform certain operations without generating a request or notification and/or receiving approval from the coexistence coordinator 505. For instance, the first radio 501 may be configured to wirelessly communicate using a plurality of frequency ranges including a first frequency range that overlaps with a second frequency range employed by the second radio 503 and one or more third frequency ranges that do not overlap with the second frequency range employed by the second radio 503. In such an instance, the first radio 501 may only generate requests or notifications associated with operations that involve communication in the first frequency range and not generate requests or notifications associated with operations in the one or more third frequency ranges (e.g., because such operations are unlikely to interfere with operations by the second radio in the second frequency range). For illustration, the first radio 501 may comprise a WIFI radio configured to communicate in a 2.4 GHz frequency range and at least one of a 5 GHz frequency range and a 6 GHz frequency range while the second radio 503 may comprise a BLUETOOTH radio configured to operate in a frequency range that only overlaps with the 2.4 GHz frequency range. In such a scenario, the WIFI radio may only generate request or notifications for the coexistence coordinator 505 for operations that involve the 2.4 GHz frequency range and not generate requests or notifications for operations that involve the 5 GHz frequency range and/or the 6 GHz frequency range.

The coexistence coordinator 505 may be configured to receive the requests or notifications from at least some of the plurality of radios 507 (e.g., the first radio 501 and the second radio 503). The coexistence coordinator 505 may employ any of the radio coexistence techniques described herein to dynamically coordinate operation of at least some of the plurality of radios so as to avoid interference while maximizing performance (e.g., reducing latency, increasing bandwidth, etc.). For instance, the coexistence coordinator 505 may be configured to allow (or deny) requests in accordance with any combination of the techniques described below with respect to FIGS. 7, 8A, 8B, 8C, 8D, and 9.

The coexistence logic implemented by coexistence coordinator 505 to coordinate operation of at least some of the plurality of radios 507 in accordance with the radio coexistence techniques described herein may be achieved in any of a variety of ways. For example, one or more functions of the coexistence logic may be implemented using program instructions executed by at least one processor of the communication interface component(s) 502. Additionally (or alternatively), one or more functions of the coexistence logic may be implemented using special-purpose circuitry integrated into the communication interface component(s) 502. Accordingly, the coexistence logic may be implemented using software, hardware, or any combination thereof.

It should be appreciated that the communication interface component(s) 502 may be implemented as one or more circuits that may be incorporated into one or more integrated circuit (IC) dies. These one or more IC dies may be left unpacked, integrated into one or more circuit packages, or any combination thereof. For instance, the communication interface component(s) 502 may be implemented in a single IC die (e.g., as a combination BLUETOOTH and WIFI wireless transceiver IC) that is left unpackaged or integrated into a single package. In other instances, the communication interface component(s) 502 may be implemented using a plurality of IC dies (e.g., that may be communicatively coupled via communication terminals in each of the IC dies that may be electrically coupled using conductive traces in a common circuit board (or other substrate) that the IC dies are attached to). For example, the first radio 501 may be implemented in a first IC die, the second radio 503 may be implemented in a second IC die, and the coexistence coordinator 505 may be implemented in either a third IC die or one of the first or second IC dies. In this example, the IC dies may be integrated into a single package, separate circuit packages, and/or left unpackaged. Thus, the network interface components 502 may be implemented in any of a variety of ways.

The front-end component(s) 504 may be configured to filter and/or route signals from the communication interface component(s) 502 and/or the antenna(s) 506. The front-end component(s) 504 may comprise any of a variety of electrical elements including, for example, one or more of the following elements: filter(s) (e.g., a bulk acoustic wave (BAW) filter, surface acoustic wave (SAW) filter, etc.), diplexer(s), switch(es) (e.g., transmit/receive switches), amplifier(s) (e.g., low-noise amplifier(s) (LNAs)), or coupler(s). The front-end component(s) 504 may be implemented in any of a variety of ways. For example, the front-end component(s) 504 may comprise separate circuitry for each of the first and second radios 501 and 503, respectively, as shown by front-end circuitry 507A and 507B, respectively. In other examples, front-end circuitry in the front-end component(s) 504 may be shared by one more than one radio (e.g., shared by two or more radios). Accordingly, the front-end component(s) 504 may be implemented in any of a variety of ways.

The antenna(s) 506 may be coupled to the front-end component(s) 504 and configured to facilitate emission (and/or detection) of electromagnetic waves. The antenna(s) 506 may comprise one or more multi-band antennas configured to operate on several frequency bands (e.g., two or more of a 2.4 GHz band, a 5 GHz band, or a 6 GHz band) and/or one or more single-band antennas configured to operate on one frequency band (e.g., one of a 2.4 GHz band, a 5 GHz band, or a 6 GHz band). The antenna(s) 506 may, for example, be implemented using one or more passive antennas, one or more active antennas, or any combination thereof. As shown, the antenna(s) 506 may, in some instances, comprise a distinct set of one or more antennas for each of the first radio 501 and the second radio 503 (shown by antenna(s) 509A and 509B, respectively). In such instances, the antenna(s) associated with each of the first radio 501 and the second radio 503 may be spatially diverse to increase the isolation between the antenna(s) and, advantageously, mitigate the possibility of interference from simultaneous operation of the first and second radios 501 and 503, respectively. In other instances, the antenna(s) 506 may comprise one or more antennas that are shared between the first and second radios 501 and 503, respectively. While sharing one or more antennas may increase the possibility of interference, such antenna sharing may reduce the size, complexity, and/or cost of the communication system 500 (e.g., that may be desirable in compact and/or low-cost devices). As discussed in greater detail below, the isolation between the antennas associated with different radios may, in some examples, be taken into account by the coexistence coordinator 505 in coordinating operation of radios (e.g., the first radio 501 and the second radio 503).

It should be appreciated that various alterations may be made to the communication system 500 without departing from the scope of the present disclosure. For example, the plurality of radios 507 may comprise more than two radios (e.g., three radios, four radios, etc.). Additionally (or alternatively), the antenna(s) 506 may comprise more or less than two antennas. For instance, the antenna(s) 506 may only comprise a single antenna that is shared by the first and second radios 501 and 503, respectively. In other instances, the antenna(s) 506 may comprise two or more first antennas for the first radio 501 and one or more second antennas for the second radio 503. Accordingly, the antenna(s) 506 may comprise any number of antennas.

Figure 6:
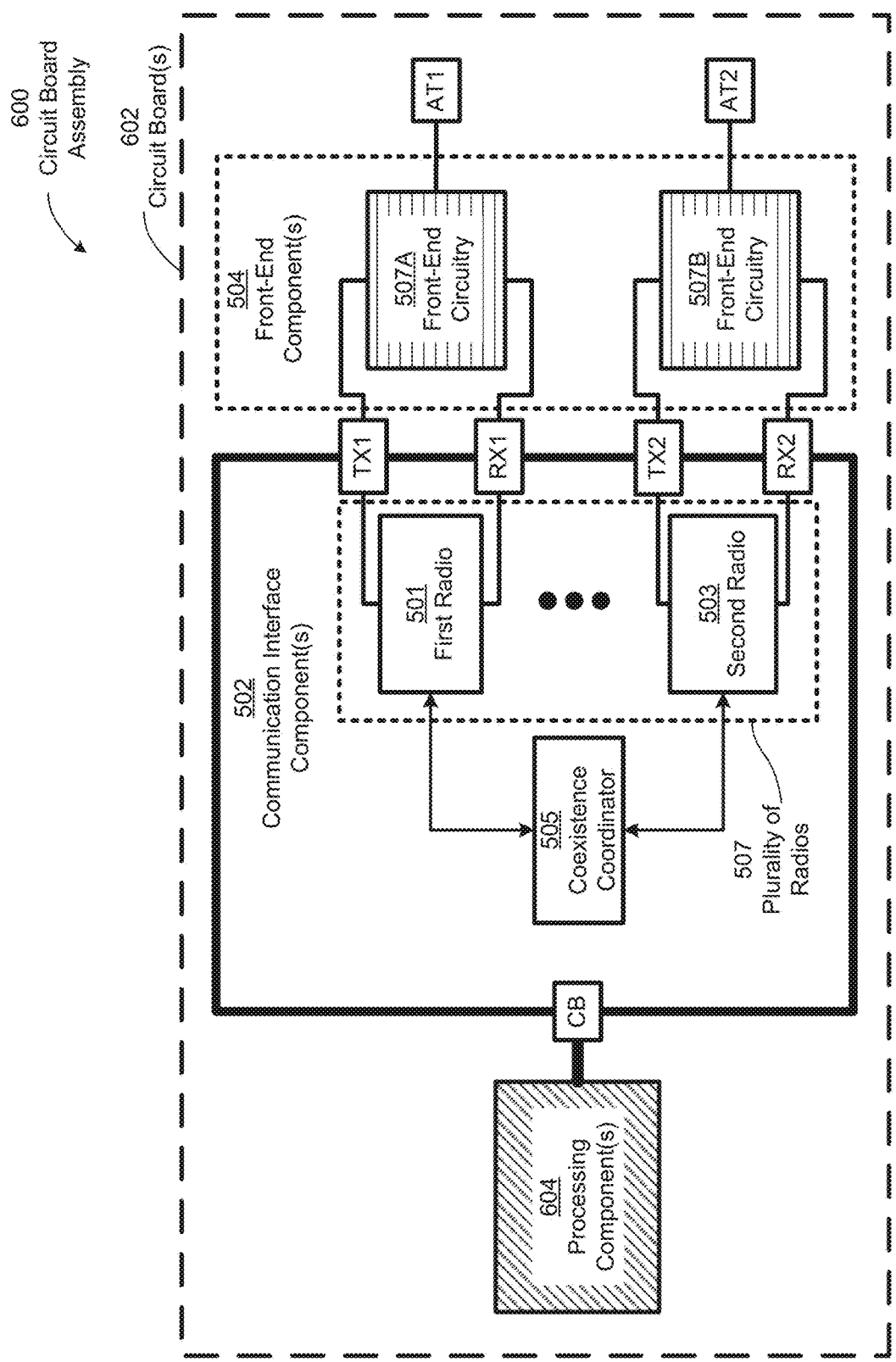
FIG. 6 is a functional block diagram of an example circuit board assembly comprising certain components of the communication system of FIG. 5 in accordance with aspects of the disclosure.

FIG. 6 shows an example circuit board assembly 600 comprising certain components of the communication system 500 that may be integrated into any of a variety of devices including any of the devices described herein. As shown, the circuit board assembly 600 comprises a circuit board(s) 602 onto which the communication interface component(s) 502 and the front-end component(s) 504 from the communication system 500 are mounted (or otherwise attached) to. The circuit board assembly 600 further comprises processing component(s) 604 (e.g., processor 212) that are mounted (or otherwise attached) to the circuit board(s) 602 and communicatively coupled to a communication bus terminal (shown as CB) of the communication interface component(s) 502. The circuit board assembly 600 further comprises one or more antenna terminals (shown as a first antenna terminal (AT1) and a second antenna terminal (AT2)) that may be configured to connect to one or more antennas (e.g., antenna(s) 506).

It should be appreciated that, in some implementations, one or more of the antennas may be directly integrated into the circuit board(s) 602 (e.g., and one or more of the corresponding antenna terminals may be omitted). For instance, one or more of the antennas may be printed antennas (sometimes referred to as microstrip antennas) that may be part of the circuit board(s) 602.

Figure 7:
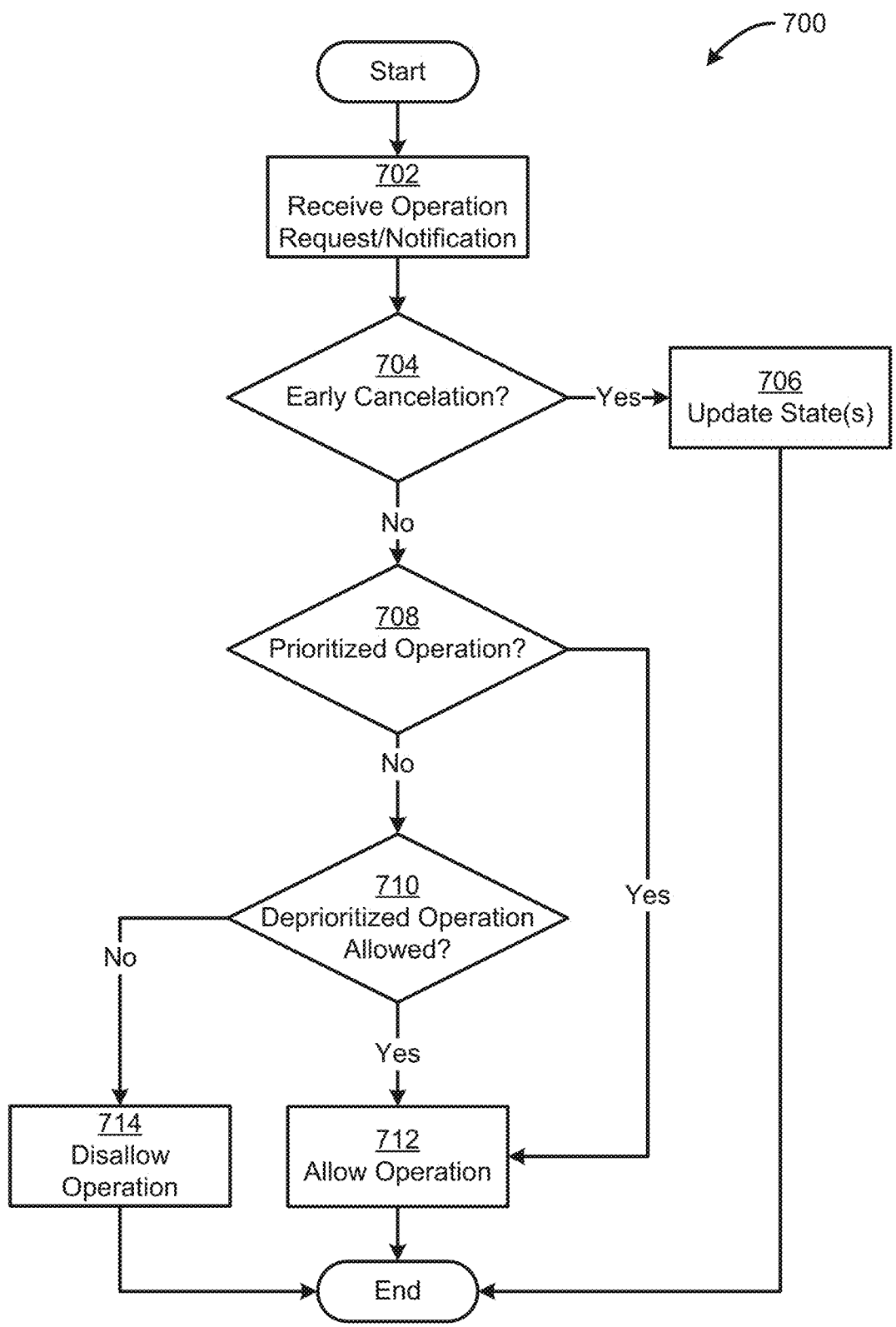
FIG. 7 is a flow diagram of example process for coordinating operation of multiple radios in accordance with aspects of the disclosure.

FIG. 7 depicts an example process 700 for coordinating operation of a plurality of radios. The process 700 may be performed by, for example, a coexistence coordinator (e.g., coexistence coordinator 505) in communication interface component(s) (e.g., communication interface component(s) 502) of a device (e.g., any of the devices described herein). As shown, the process 700 comprises a block 702 of receiving an operation request or notification, a block 704 of determining whether the request or notification comprises an indication of early cancellation, a block 706 of updating state(s), a block 708 of determining whether an operation in the request or notification comprises a prioritized operation, a block 710 of determining whether a deprioritized operation is allowed, a block 712 of allowing the operation, and a block 714 of disallowing the operation.

In block 702, the coexistence coordinator may receive an operation request or notification. The coexistence coordinator may receive the operation request or notification from a radio that needs to perform an operation (e.g., a transmit operation, a receive operation, etc.) and/or terminate a previously requested operation early (e.g., terminate a previously allowed receive operation). The operation request or notification may comprise any of a variety of information. For example, the operation request or notification may comprise one or more of the following elements: (1) an indication of a type of operation to be performed/canceled (e.g., transmit, receive, etc.); (2) an indication of whether an operation is to be performed or terminated early; (3) an indication of a priority of the operation to be performed (e.g., high priority, medium priority, low priority, etc.); (4) an indication of a power level (e.g., transmit power level) and/or gain (e.g., receive gain level) associated with the operation; (5) an indication of a protocol to be used to perform the operation (e.g., BLUETOOTH Classic, BLUETOOTH LOW ENERGY (BLE), 802.11ac, 802.11ax, etc.); and/or (6) an indication of a duty cycle of the radio (e.g., a time spent performing operations relative to available operation time).

Figure 8A:
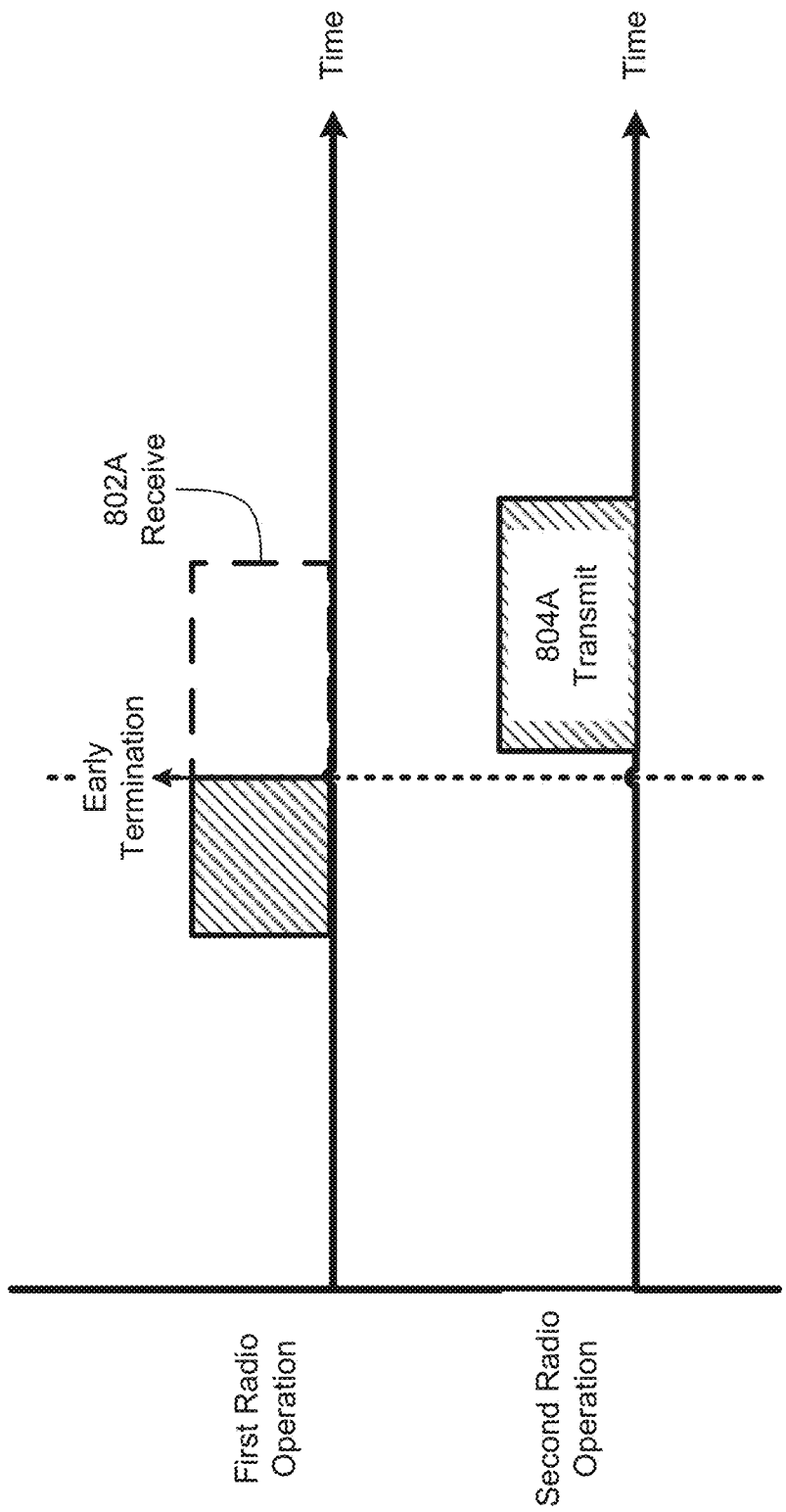
FIGS. 8A-8D are diagrams depicting examples of coordinated operation of two radios in accordance with aspects of the disclosure.

In block 704, the coexistence coordinator may determine whether the request or notification from a radio comprises an indication of an early cancelation (e.g., of a previously allowed operation). If the coexistence coordinator determines that the request or notification does not comprise an indication of an early cancelation, the coexistence coordinator may proceed to block 708 of determine whether the operation is prioritized. Otherwise, the coexistence coordinator may proceed to block 706 and update one or more states. For instance, in block 706, the coexistence coordinator may update one or more values associated with a current state of the radios to reflect that a previously allowed operation will be terminated early. As a result, the coexistence coordinator may allow another operation to be performed within a portion of time previously allocated for performance of the (now canceled) operation as depicted in FIG. 8A. In particular, a receive 802A performed by the first radio is terminated early (e.g., after receipt of the preamble and/or header) and the coexistence coordinator allows the second radio to perform a transmit operation 804A before the original receive operation 802A would have ended (had the receive 802A not been terminated early).

Referring back to FIG. 7, in block 708, the coexistence coordinator may determine whether the operation to be performed is a prioritized operation. If the coexistence coordinator determines that an operation is prioritized, the coexistence coordinator may proceed to block 712 and allow the operation. Otherwise, the coexistence coordinator may proceed to block 710 and determine whether a deprioritized operation is allowed.

The coexistence coordinator may determine whether the operation is prioritized in any of a variety of ways. For instance, the coexistence coordinator may define periods of time in which operations associated with a particular radio are automatically deemed prioritized (e.g., and operations from other radios are deprioritized). Such periods of time may be interposed (e.g., alternate) and have durations that are dynamically adjusted based on a variety of information including, for example, a duty cycle (e.g., fraction of time spent operating) of the radios (e.g., as indicated in the requests or notifications from the radios).

Figure 8B:
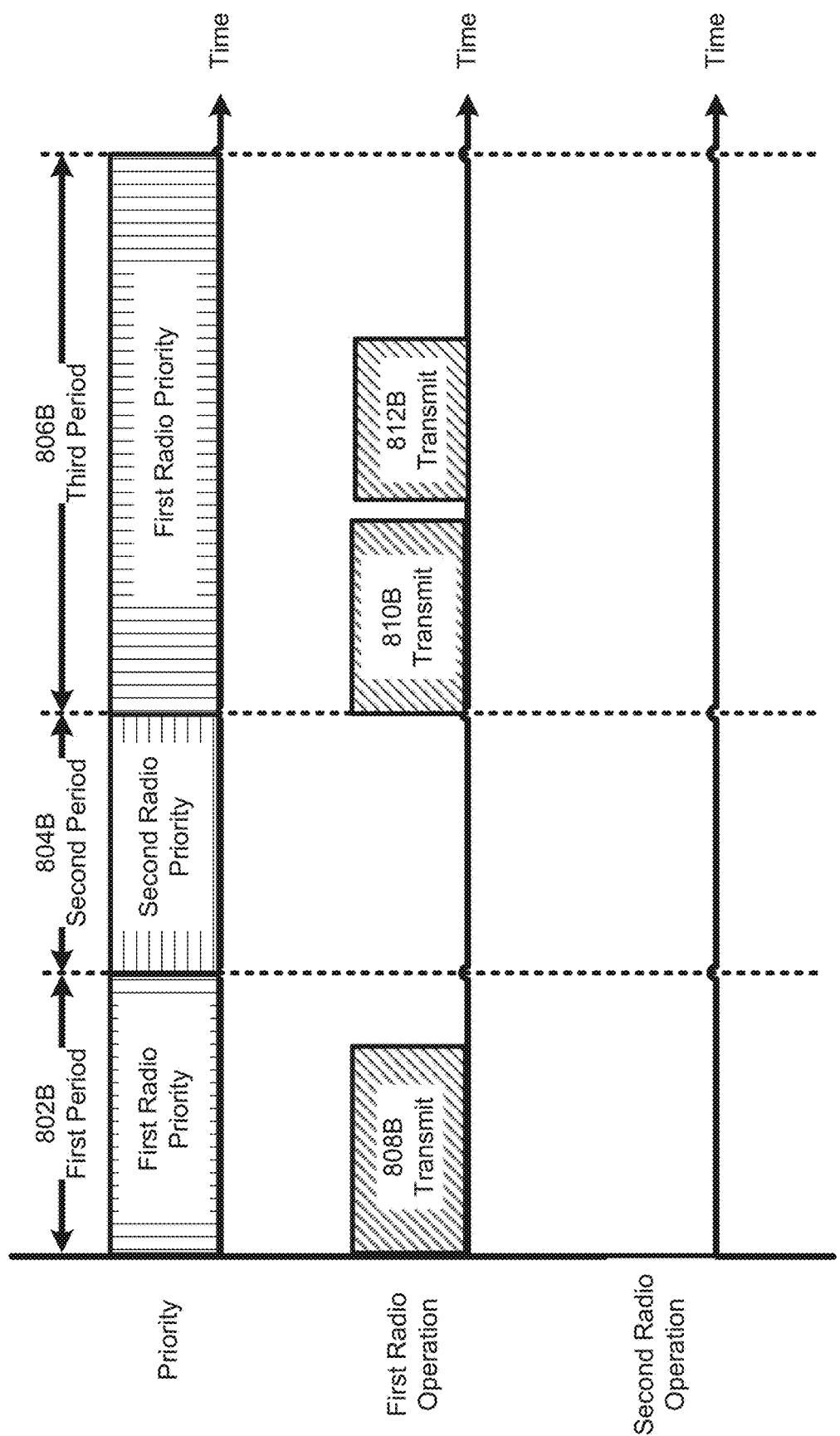

For illustration, FIG. 8B depicts such an example period adjustment based on duty cycle. In FIG. 8B, three successive periods are shown including a first period 802B where the first radio has priority, a second period 804B where the second radio has priority, and a third period 806B where the first radio has priority. The first radio performs a transmit 808B during the first period 802B while the second radio is idle during the first and second periods 802B and 804B. As a result, a duty cycle of the first radio is considerably higher than a duty cycle of the second radio. Accordingly, the coexistence coordinator may increase a length of subsequent periods where the first radio is prioritized (e.g., as shown by the longer third period 806B relative to the first period 802B) to better accommodate the higher volume of traffic on the first radio relative to the second radio (e.g., as shown by transmit operations 810B and 812B in the third period 806B).

It should be appreciated that a coexistence coordinator may vary the duration and/or frequency of priority periods for respective radios based on information separate and apart from duty cycle. For example, the coexistence coordinator may vary the duration and/or frequency of priority periods of respective radios based on the protocol (or dominant protocol if multiple protocols are being used) by a given radio. For instance, a radio (e.g., a BLUETOOTH radio) may be capable of operating using multiple protocols (e.g., a BLUETOOTH classic protocol or a BLE protocol). Given that the duration of various operations (e.g., transmit and/or receive operations) may differ between the protocols (e.g., length of a receive operation for BLUETOOTH Classic may be different from the length of a receive operation for BLE), the coexistence coordinator may adjust the duration and/or frequency of priority periods based on the characteristics of the protocol or dominant protocol being used by a given radio. For example, in situations where a radio is using a first protocol with a longer receive and/or transmit operations, the duration of priority periods for that radio may be longer than when that radio is using a second protocol with short receive and/or transmit operation.

In some examples, the coexistence coordinator may determine whether the operation to be performed is a prioritized operation based on information separate and apart from defined prioritization periods. For instance, the coexistence coordinator may employ information in the request or notification (e.g., a priority indication) to determine whether the operation is a prioritized operation. Any of a variety of operations may be prioritized depending on the particular implementation (e.g., operations of a certain class, operations with a certain type of data, etc.). Examples of operations that may be prioritized include ACKs in an ARQ scheme. As described above, delay of ACK transmissions may undesirably increase network latency and reduce throughput.

Figure 8C:
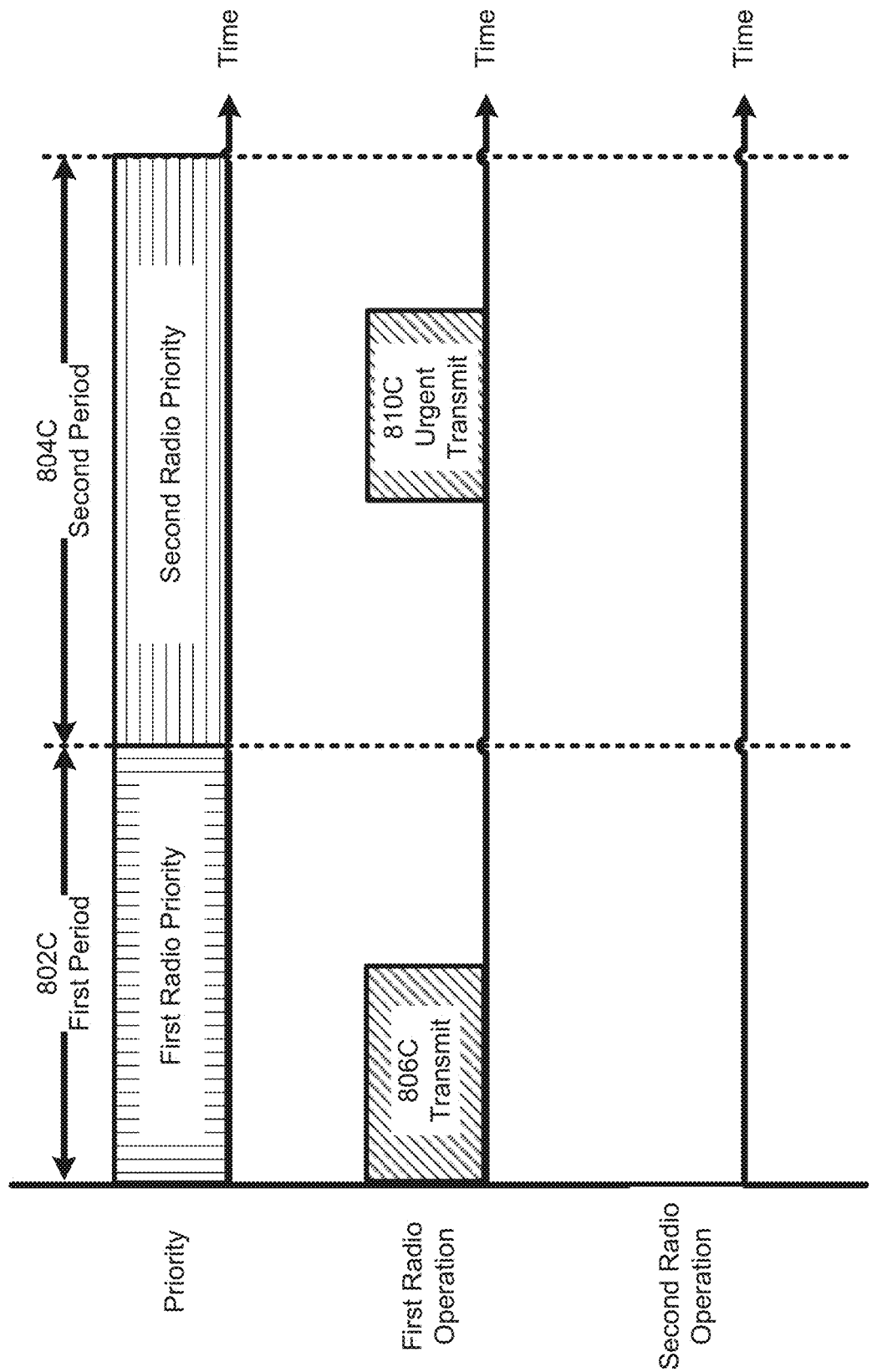

For illustration, FIG. 8C depicts such an example operation prioritization. FIG. 8C shows two successive periods including a first period 802C where the first radio has priority and a second period 804C where the second radio has priority. During the first period 802C where the first radio has priority, the first radio performs a transmit operation 806C. During the second period where the second radio has priority, the first radio (despite not being prioritized) is allowed to make an urgent transmission 810C (e.g., transmit an ACK) without having to wait for a subsequent period where the first radio has priority.

Returning to FIG. 7, in block 710, the coexistence coordinator may determine whether a deprioritized operation is allowed. If the deprioritized operation is allowed, the coexistence coordinator may proceed to block 712 and allow the operation. Otherwise, the coexistence coordinator may proceed to block 714 and disallow the operation (e.g., causing that operation is be delayed by some period of time). The coexistence coordinator may make such a determination in any of a variety of ways. For instance, the coexistence coordinator may allow deprioritized operations in instances where one or more other radios are idle (e.g., not performing an operation). For example, a deprioritized operation from a BLUETOOTH radio may be allowed in an instance where a 2.4 GHz WIFI radio is idle (and/or has been idle for some threshold period of time). In scenarios where another operation is being performed (e.g., or is about to be performed), the coexistence coordinator may determine whether simultaneous operation is allowed. If simultaneous operation is allowed, the deprioritized operation may be allowed. Otherwise, the deprioritized operation may be disallowed.

Figure 8D:
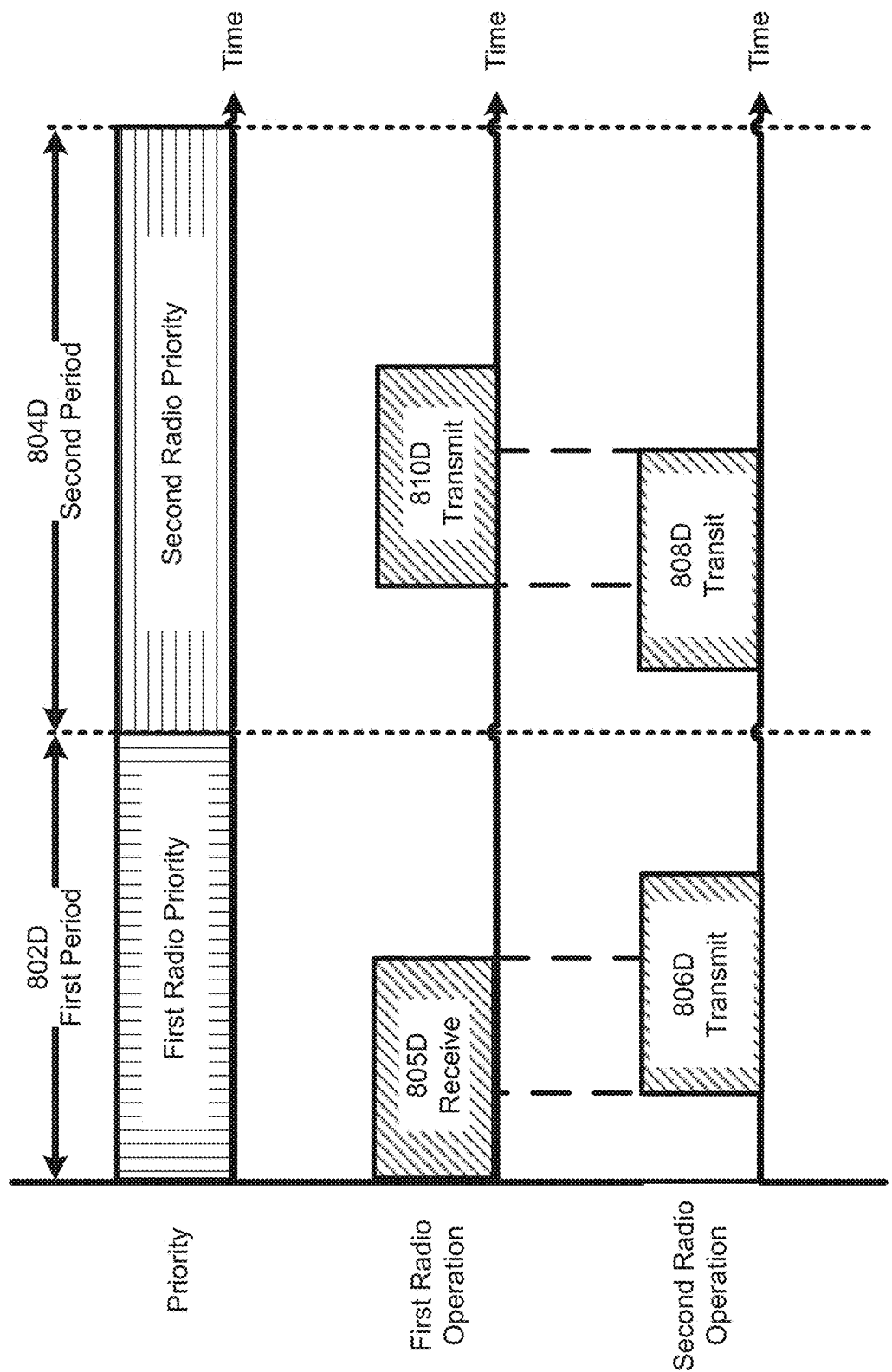

For illustration, FIG. 8D depicts such an example of simultaneous operation. FIG. 8D shows two successive periods including a first period 802D where the first radio has priority and a second period 804D where the second radio has priority. During the first period 802D where the first radio has priority, the first radio performs a receive operation 805D. Further, during the first period 802D, the second radio performs a transmit operation 806D before the operation 805D is complete (e.g., resulting in simultaneous operation of the first and second radios). During the second period 804D, the second radio performs a transmit operation 808D and the first radio starts a transmit operation 810D before the transmit operation 808D is complete (e.g., again resulting in simultaneous operation of the first and second radios).

The coexistence coordinator may determine whether simultaneous operation is allowed in any of a variety of ways. In some instances, the coexistence coordinator may obtain one or more parameters regarding the operation to be performed (and/or the operation that is currently being performed or about to be performed) and employ such obtained parameters to determine whether simultaneous performance of these operations is likely to result in interference. If simultaneous performance of these operations is unlikely to result in interference (e.g., based on the obtained parameters), the coexistence coordinator may allow the deprioritized operation. Otherwise, the coexistence coordinator may disallow the operation. Any of a variety of parameters may be obtained by the coexistence coordinator in determining whether simultaneous operation is allowed including any of the parameters described herein. Examples of such parameters include: (1) a type of the operation (e.g., a transmit, a receive, etc.); (2) a power level associated with the operation; (3) a type of operation that is already being performed (and/or is about to be performed); (4) a power level (and/or gain) associated with operation that is already being performed (and/or is about to be performed); (5) an indication of a received signal strength associated with communication via at least one radio; (6) an indication of a spacing between at least two antennas associated with different radios; and (7) an amount of isochronous data to communicate within an interval associated with a radio.

In some examples, the coexistence may determine whether to allow simultaneous operation using, at least in part, a combination of (i) an indication of the type of operation to be performed; and (ii) an indication of the operation that is already being performed (and/or about to be performed). For instance, certain combinations of operations may be unlikely to cause interference while other combinations of operations may likely result in interference. For illustration, Table 1 shows a set of simultaneous operation scenarios and an example set of rules for each scenario.

TABLE 1

Example Simultaneous Operation Scenarios

| | Scenario | | |
|---|---|---|---|
| | Simultaneous Receive Operations | Simultaneous Transmit Operations | Simultaneous Transmit and Receive Operations |
| Allow/Reject | Allow | Allow (e.g., with transmit power restrictions) | Dynamically Allow/Disallow (e.g., with transmit power and/or receive gain restrictions) |

As shown in Table 1, the coexistence coordinator may allow (e.g., always allow) simultaneous receive operations. Simultaneous receive operations are unlikely to result in a degradation of receive perform of either radio at least because neither of the radios are generally causing antennas to emit a significant electromagnetic energy into a common frequency range within the wireless spectrum. The coexistence coordinator may also allow simultaneous transmit operations (e.g., with power restrictions). Simultaneous transmit operations are less likely to results in reduced performance (e.g., degrade the ability of respective target devices to successfully receive the transmissions) when the power levels for the transmit operations are managed appropriately. For instance, the coexistence coordinator may allow simultaneous transmit operations with power restrictions on at least one of the simultaneous transmissions (e.g., on a lower and/or lowest priority transmission) to mitigate the chance of creating substantial interference. The coexistence coordinator may dynamically allow/disallow (e.g., with transmit power and/or receive gain restrictions) simultaneous transmit and receive operations based on one or more other parameters (e.g., indicative of the particular situation). One risk in the simultaneous transmit and receive scenario is that the transmit operation performed by a first radio may cause a significant amount of energy to be emitted into a common portion of the wireless spectrum that is seen by a second radio attempting to perform a receive operation, which can overpower a weaker wireless signal attempting to be received. Accordingly, the coexistence coordinator may only allow such simultaneous receive and transmit operations in particular scenarios (e.g., identified based on one or more parameters).

Further, in some examples, the coexistence may determine whether to allow simultaneous operation using, at least in part (e.g., separate from or combined with any other values described herein), on an indication of antenna separation (and/or isolation) between antennas associated with different radios. For instance, a value indicative of the separation (and/or isolation) between certain antennas may be (directly or indirectly) accessible to the coexistence coordinator (e.g., the value may be written to a memory (e.g., at time of manufacture, device setup, device update, etc.) that is (directly or indirectly) accessible by the coexistence coordinator). In such an instance, the coexistence coordinator may access the value in determining whether to allow (or disallow) simultaneous operation. For example, the coexistence coordinator may allow simultaneous operation in greater frequency and/or at higher power (or gain) levels where the antenna separation (and/or isolation) is higher and in lesser frequency and/or at lower power (or gain) levels where the antenna separation is smaller.

Still yet further, in some examples, the coexistence may determine whether to allow simultaneous operation using, at least in part (e.g., separate from or combined with any other values described herein), on an indication of received signal strength associated with messages received by a radio (e.g., from a target device that the radio is communicating with). For example, the coexistence coordinator may employ the indication of received signal strength to determine whether a target device that the given radio is communicating with is sufficiently close to allow a lower transmit power level. Should the received signal strength be sufficiently high to allow a reduction in the transmit power level, the coexistence coordinator may allow the operation with a power level restriction (e.g., a transmit power restriction). Otherwise, the coexistence engine may disallow the operation.

Figure 9:
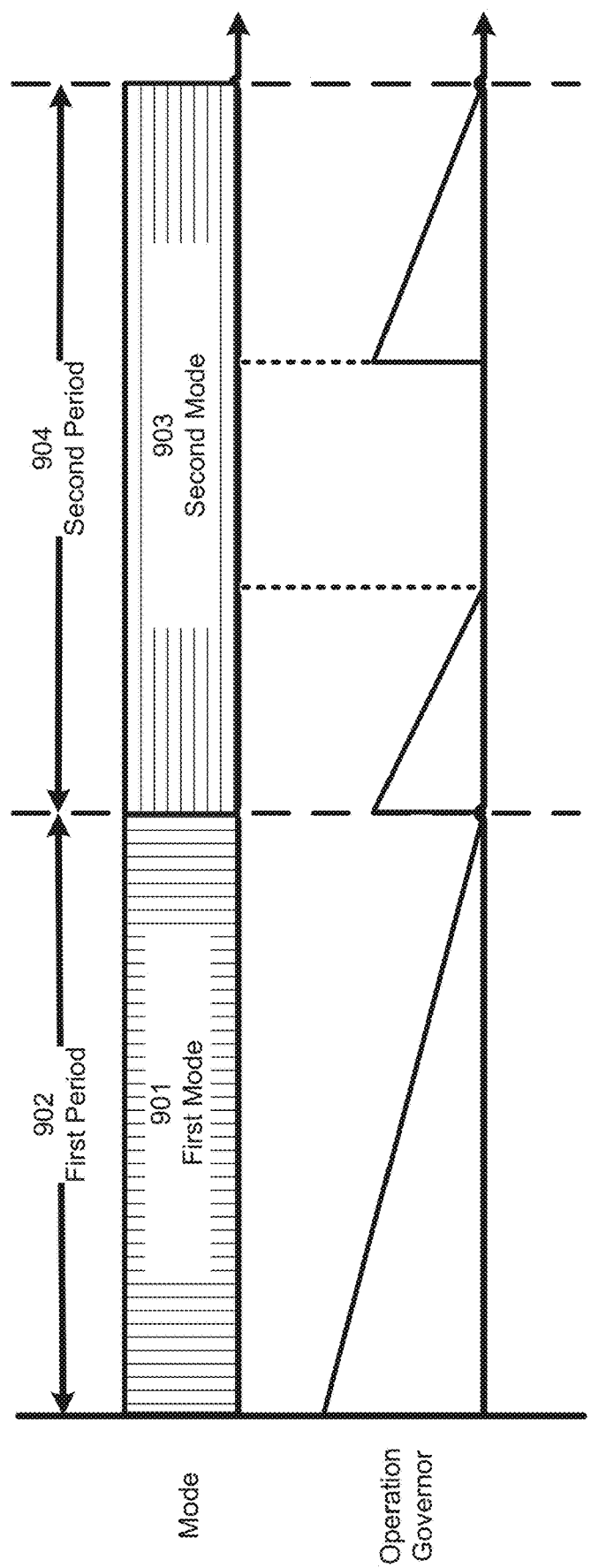
FIG. 9 is a diagram depicting an example radio prioritization scheme in accordance with aspects of the disclosure.

It should be appreciated that the radio prioritization during certain time periods described herein (and shown in FIGS. 8B-8D) may be implemented in any of a variety of ways. For instance, in some examples, the radio prioritization during certain time periods may be implemented using a set of operating modes and/or operation governors. For example, FIG. 9 depicts an example of such a scheme implementing radio prioritization that employs a plurality of modes (shown as a first mode 901 and a second mode 903) and an operation governor. As shown, the first and second modes 901 and 903, respectively, may be interposed (e.g., alternate) and the operation governor may countdown from a starting value to zero (e.g., such as a countdown timer). The combination of the current mode and the state of the operation governor (e.g., whether the operation governor is above zero or zero), may dictate which set of one or more radios and/or specific operations may be prioritized relative to other radios and/or other specific operations. For instance, the operation governor may function as a transmit governor for a WIFI radio whereby transmit operations for the WIFI radio are only allowed when the transmit governor is above zero. As shown, the transmit governor may be set differently in the first mode relative to the second mode (e.g., start the countdown at different values resulting in different durations) to allow such transmissions to occur more frequently in the first mode 901 relative to the second mode 903. In particular, the WIFI radio may transmit during the entire first period 902 and only during a subset of the second period 904. Accordingly, the WIFI radio may be prioritized during the first mode 901 and deprioritized during the second mode 903 (e.g., in favor of prioritizing another radio such as a BLUETOOTH radio).

Figure 12:
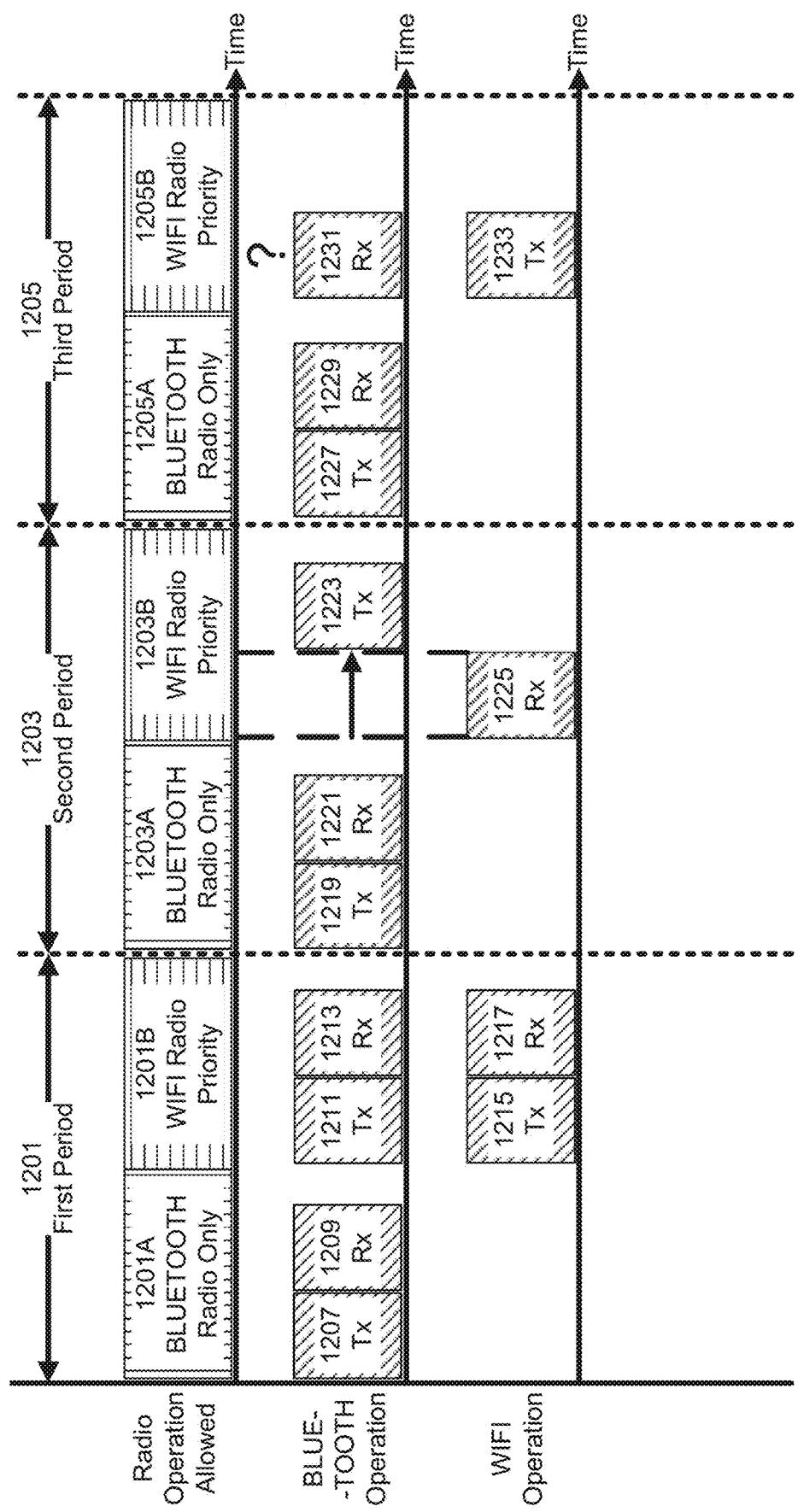
FIG. 12 is a diagram depicting another example radio prioritization scheme in accordance with aspects of the disclosure.

Some coexistence schemes that attempt to balance communications adhering to BLUETOOTH and WIFI protocols can underperform time-division duplexing (TDD) when applied to WIFI and BLE audio streams. As such, in some examples, a coexistence coordinator (e.g., the coexistence coordinator 505 of FIG. 5) is configured to utilize the techniques described herein to implement a flexible coexistence scheme that is well suited for WIFI and BLE audio streams. FIG. 12 illustrates one such coexistence scheme in which BLUETOOTH and WIFI radio operations are allowed by the coexistence coordinator within three time periods 1201, 1203, and 1205. The BLUETOOTH operations may be performed by a BLUETOOTH radio (e.g., the first radio 501 of FIG. 5). The WIFI operations may be performed by a WIFI radio (e.g., the second radio 503 of FIG. 5). The operations themselves may be, for example, transmit (Tx) or receive (Rx) operations.

In some examples, the coexistence coordinator is configured to control the duration of each of the time periods 1201, 1203, and 1205 to span an isochronous interval of the BLUETOOTH radio. In these examples, the coexistence coordinator is configured to allocate each of the time periods 1201, 1203, and 1205 into a first portion (e.g., 1201A, 1203A, and 1205A), in which the BLUETOOTH radio is allowed to operate exclusively, and a second portion (e.g., 1201B, 1203B, and 1205B) in which the WIFI radio is given priority. For instance, in some examples, the coexistence coordinator is configured to allocate each of the time periods into the portions 1201A-1205B using operating modes and/or operation governors as described above with reference to FIG. 9. In some examples, the coexistence coordinator is configured to dynamically adjust the duration of the first and second portions to maximize the quantity of time within the WIFI radio priority portion subject to ensuring that all BLUETOOTH isochronous data communications required to maintain a predetermined quality of service level are scheduled. In some examples, the radio prioritization techniques described herein with reference to FIGS. 8B-8D are used to execute these dynamic adjustments.

For instance, in at least one example, the coexistence coordinator is configured to establish and activate a first operating mode that prioritizes the BLUETOOTH radio to perform operations exclusively while a corresponding operation governor has a non-zero value. In this example, the coexistence coordinator is configured to set a starting value of the operation governor to a value large enough to perform all BLUETOOTH isochronous operations scheduled to maintain a predetermined quality of service level. This first operating mode corresponds to the time portions 1201A, 1203A, and 1205A illustrated in FIG. 12. Alternatively or additionally, in at least one example, the coexistence coordinator is configured to establish and activate a second operating mode that prioritizes the WIFI radio over the BLUETOOTH radio while a corresponding operation governor has a non-zero value. In this example, the coexistence coordinator is configured to set a starting value of the operation governor to a value large enough for the operating duration of the first mode and the second mode to span an isochronous interval configured for the BLUETOOTH radio. This second operating mode corresponds to the time portions 1201B, 1203B, and 1205B illustrated in FIG. 12.

In some examples, the coexistence coordinator may be further configured to, for portions of time in which the BLUETOOTH radio is allowed to operate exclusively, request that an access point (e.g., the network router 109 of FIG. 1) enter a power saving mode in which the access point does not perform transmit operations. The coexistence coordinator may be configured to, within portions of time in which the WIFI radio is given priority, allow the BLUETOOTH radio and the WIFI radio to transmit concurrently and to receive concurrently but require the BLUETOOTH radio avoid using a frequency used by the WIFI radio within margins. However, the coexistence coordinator may be configured to not allow, within these portions of time, the BLUETOOTH radio to transmit while the WIFI radio is receiving. In addition, the coexistence coordinator may be configured to, within portions of time in which the WIFI radio is given priority, allow the BLUETOOTH radio to receive while the WIFI radio is transmitting, although such receipt by the BLUETOOTH radio is limited to best efforts (e.g., BLUETOOTH operations that fail during WIFI priority periods will not result in a change to the scheme).

As shown in FIG. 12, the BLUETOOTH radio transmits 1207 and receives 1209 (e.g., isochronous data via an isochronous channel) during the 1201A portion of the first period 1201. However, during the 1201B portion, both the BLUETOOTH radio and the WIFI radio transmit 1211, 1215 and receive 1213, 1217 at the same time. Next, the BLUETOOTH radio transmits 1219 and receives 1221 during the 1203A portion of the second period 1203. However, during the 1203B portion, the BLUETOOTH radio postpones a transmit operation 1223 to enable the WIFI radio to perform a receive operation 1225 free of any potential interference from the BLUETOOTH radio. In this way, the BLUETOOTH radio complies with rules governing operation of the radios during WIFI radio priority portions. Lastly, as shown in FIG. 12, the BLUETOOTH radio transmits 1227 and receives 1229 during the 1205A portion of the third period 1205. However, during the 1205B portion, the BLUETOOTH radio performs, at best efforts, a receive operation 1231 while the WIFI radio performs a transmit operation 1233. The receive operation 1231 may or may not be successful, but the BLUETOOTH radio can, if desirable, re-perform the receive operation 1231 within the 1205B portion or within a subsequent BLUETOOTH radio only portion of a subsequent period, for example.

The flexible coexistence scheme illustrated in FIG. 12 can handle both synchronous and asynchronous streams well. When operating under this scheme BLUETOOTH streams are given an exclusive allocation to guarantee performance. In addition, asynchronous BLUETOOTH transmit and receive operations share allocations together with WIFI operations. Since WIFI traffic is asynchronous, the asynchronous BLUETOOTH operations utilize the shared allocations opportunistically, to advantageous effect. As such, the flexible coexistence scheme illustrated in FIG. 12 avoids problems present with other schemes when applied to WIFI and BLE audio streams. Examples of these problems include the following: (1) an excessive inability for WIFI to transmit (payloads and/or ACKs), which (in the case of ACKs) can have a deleterious effect on access point adaptation rate; (2) the presence of substantial WIFI signal strength, which can have an adverse effect on BLUETOOTH performance; (3) limitations on BLUETOOTH transmit power and frequency hopping, which can limit the ability of BLUETOOTH communications to handle 2.4 GHz congestion; and (4) a need to process BLUETOOTH isochronous streams concurrently with WIFI communications.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

In addition to the examples described herein with respect to stationary playback devices, embodiments of the present technology can be applied to headphones such as over-ear headsets, on-ear headsets, and in-ear headsets. For example, such headphones can include noise-cancellation functionality to reduce the user's perception of outside noise during playback. In some embodiments, noise classification can be used to modulate noise cancellation under certain conditions. For example, if a user is listening to music with noise-cancelling headphones, the noise cancellation feature may be temporarily disabled or down-regulated when a user's doorbell rings. Alternatively or additionally, the playback volume may be adjusted based on detection of the doorbell chime. By detecting the sound of the doorbell (e.g., by correctly classifying the doorbell based on received sound metadata), the noise cancellation functionality can be modified so that the user is able to hear the doorbell even while wearing noise-cancelling headphones. Various other approaches can be used to modulate performance parameters of headphones or other such devices.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A playback device comprising: a communication interface comprising a plurality of wireless radios comprising a first radio to facilitate wireless communication in a first frequency range, and a second radio to facilitate wireless communication in a second frequency range that at least partially overlaps with the first frequency range, the communication interface being configured to after a determination that an operation is to be performed by one radio from the plurality of wireless radios, obtain at least one parameter, the at least one parameter comprising an indication of a communication protocol to be used in the operation, determine a priority radio from the first radio and the second radio with reference to an interval associated with the first radio or the second radio and an amount of isochronous data to communicate within the interval, and determine whether to allow the one radio to perform the operation based on the at least one parameter and the priority radio; an audio amplifier; at least one processor; and at least one non-transitory computer-readable medium comprising program instructions that are executable by the at least one processor such that the playback device is configured to while receiving a first data stream comprising audio content via the first radio, play back the audio content using the audio amplifier; generate a second data stream based on the audio content; and transmit the second data stream via the second radio to at least one external device.

(Feature 2) The playback device of feature 1, wherein to determine the priority radio comprises to identify an active operating mode of the communication interface, the active operating mode prioritizing a WIFI radio over a BLUETOOTH radio.

(Feature 3) The playback device of feature 2, wherein to determine whether to allow the one radio to perform the operation comprises to: determine that the at least one parameter is an indication of a BLUETOOTH protocol; and determine whether the operation is scheduled to be performed concurrently with a same operation of the WIFI radio.

(Feature 4) The playback device of either feature 2 or feature 3, wherein to determine whether to allow the one radio to perform the operation comprises to: determine that the at least one parameter is an indication of a BLUETOOTH protocol; determine that the operation is a transmit operation; and determine whether the transmit operation is scheduled to be performed concurrently with a receive operation of the WIFI radio.

(Feature 5) The playback device of any of features 2-4, wherein to determine whether to allow the one radio to perform the operation comprises to: determine that the at least one parameter is an indication of a BLUETOOTH protocol; and determine that the operation is a receive operation.

(Feature 6) The playback device of any of features 1-5, wherein: the playback device is a first playback device; the at least one external device comprises a second playback device; and to play back comprises to play back the audio content in synchrony with playback of the audio content by the second playback device.

(Feature 7) The playback device of feature 6, wherein: the audio content comprises one or more audio channels; and to play back comprises to play back all of the one or more audio channels in synchrony with playback of all of the one or more audio channels by the second playback device.

(Feature 8) The playback device of either feature 6 or feature 7, wherein: the audio content is multi-channel audio content comprising a plurality of audio channels; and to play back comprises to play back a first subset of the plurality of audio channels in synchrony with playback of a second subset of the plurality of audio channels by the second playback device, the second subset of the plurality of audio channels being non-overlapping with the first subset of the plurality of audio channels.

(Feature 9) The playback device of feature 8, wherein: the multi-channel audio content is stereo audio content comprising a first audio channel and a second audio channel; and to play back comprises to play back the first audio channel in synchrony with playback of the second audio channel by the second playback device.

(Feature 10) The playback device of any of features 1-9, wherein the program instructions that are executable by the at least one processor such that the playback device is configured to transmit a request to an access point to enter a power saving mode if the priority radio is a BLUETOOTH radio.

(Feature 11) A method of operating a playback device comprising a plurality of wireless radios comprising a first radio to facilitate wireless communication in a first frequency range and a second radio to facilitate wireless communication in a second frequency range that at least partially overlaps with the first frequency range, the method comprising: after determining that an operation is to be performed by one radio from the plurality of wireless radios, obtaining at least one parameter, the at least one parameter comprising an indication of a communication protocol to be used in the operation; determining a priority radio from the first radio and the second radio with reference to an interval associated with the first radio or the second radio and an amount of isochronous data to communicate within the interval; and determining to allow the one radio to perform the operation based on the at least one parameter and the priority radio; and while receiving a first data stream comprising audio content via the first radio, playing back the audio content using an audio amplifier, generating a second data stream based on the audio content, and transmitting the second data stream via the second radio to at least one external device.

(Feature 12) The method of feature 11, wherein determining the priority radio comprises identifying an active operating mode of a communication interface comprising the first radio and the second radio, the active operating mode prioritizing a WIFI radio over a BLUETOOTH radio.

(Feature 13) The method of feature 12, wherein determining to allow the one radio to perform the operation comprises: determining that the at least one parameter is an indication of a BLUETOOTH protocol; and determining whether the operation is scheduled to be performed concurrently with a same operation of the WIFI radio.

(Feature 14) The method of either feature 12 or feature 13, wherein determining to allow the one radio to perform the operation comprises: determining that the at least one parameter is an indication of a BLUETOOTH protocol; determining that the operation is a transmit operation; and determining whether the transmit operation is scheduled to be performed concurrently with a receive operation of the WIFI radio.

(Feature 15) The method of any of features 12-14, wherein determining to allow the one radio to perform the operation comprises: determining that the at least one parameter is an indication of a BLUETOOTH protocol; and determining that the operation is a receive operation.

(Feature 16) The method of any of features 11-15, wherein playing back comprises playing back the audio content in synchrony with playback of the audio content by the at least one external device.

(Feature 17) The method of feature 16, wherein: the audio content comprises one or more audio channels; and playing back comprises playing back all of the one or more audio channels in synchrony with playback of all of the one or more audio channels by the at least one external device.

(Feature 18) The method of either feature 16 or feature 17, wherein: the audio content is multi-channel audio content comprising a plurality of audio channels; and playing back comprises playing back a first subset of the plurality of audio channels in synchrony with playback of a second subset of the plurality of audio channels by the at least one external device, the second subset of the plurality of audio channels being non-overlapping with the first subset of the plurality of audio channels.

(Feature 19) The method of feature 18, wherein: the multi-channel audio content is stereo audio content comprising a first audio channel and a second audio channel; and playing back comprises to play back the first audio channel in synchrony with playback of the second audio channel by the at least one external device.

(Feature 20) The method of any of features 11-19, comprising transmitting a request to an access point to enter a power saving mode based an identity of the priority radio.

(Feature 21) A communication interface component (e.g., a wireless transceiver) for a communication system, the communication interface component comprising: a plurality of wireless radios each configured to determine that an operation is to be performed and (e.g., before performing the operation) generate a request to perform the operation, wherein the plurality of wireless radios comprises: a first radio to facilitate wireless communication in a first frequency range using at least one first communication protocol; a second radio to facilitate wireless communication in a second frequency range using at least one second communication protocol, wherein the first frequency range at least partially overlaps with the second frequency range and wherein the at least one first communication protocol is different from the at least one second communication protocol; and a coexistence coordinator configured to: receive, from one radio of the plurality of radios, the request to perform the operation (e.g., a transmit operation or a receive operation); obtain at least one parameter, wherein the at least one parameter comprises at least one of: (1) an indication of a received signal strength of a wireless signal received via the first radio and/or the second radio, (2) an indication of a spacing between at least one first antenna associated with the first radio and at least one second antenna associated with the second radio, (3) an indication of a duty cycle of the one radio, (4) a communication protocol to be employed in the operation, (5) power level associated with the operation, or (6) priority of the operation; and generate a response to the request to perform the operation based on the at least one parameter.

(Feature 22) The communication interface component of feature 21, wherein the coexistence coordinator is configured to: (e.g., after receipt of the request to perform the operation) determine whether at least one of the plurality of wireless radios is already performing an operation.

(Feature 23) The communication interface component of feature 22, wherein the coexistence coordinator is configured to generate the response to the request to perform the operation based on the at least one parameter and the determine of whether at least one of the plurality of wireless radios is already performing the operation.

(Feature 24) The communication interface component of feature 22, wherein the coexistence coordinator is configured to: when the at least one of the plurality of wireless radios is already performing an operation, determine at least one characteristic associated with the operation (e.g., a type of operation (e.g., transmit or receive), a power level (e.g., a transmit power level), etc.).

(Feature 25) The communication interface component of feature 24, wherein the coexistence coordinator is configured to generate the response to the request to perform the operation based on the at least one parameter, the determination of whether at least one of the plurality of wireless radios is already performing the operation, and (e.g., when the at least one of the plurality of wireless radios is performing the operation) the at least one character associated with the operation.

(Feature 26) The communication interface component of any of features 21-25, wherein the request to perform the operation comprises an indication of a priority of the operation.

(Feature 27) The communication interface component of any of features 21-26, wherein the coexistence coordinator is configured to generate the response to the request to perform the operation based on the at least one parameter and the priority of the operation.

(Feature 28) The communication interface component of any of features 21-27, wherein the first radio comprises a WIFI radio and wherein the at least one first communication protocol comprises an 802.11 based protocol (e.g., 802.11g, 802.11n, 802.11ac, 802.11ac+, 802.11ax, etc.).

(Feature 29) The communication interface component of feature 28, wherein the first radio is configured to: determine that a receive operation is to be performed; generate a request to perform the receive operation; receive a response comprising an indication that the receive operation is be allowed; (e.g., during receipt of a wireless transmission), determine that the communication interface component does not need to complete the receive operation (e.g., using information in a preamble and/or header of the packet such as BSS color information in an 802.11ax packet, GROUP ID information in an 802.11ac+ packet, and/or STA information in an 802.11ac+ packet); and determine the determination that the communication interface component does not need to complete the receive operation, generate an early termination message (e.g., for the coexistence coordinator).

(Feature 30) The communication interface component of any of features 21-29, wherein the coexistence coordinator is configured to: determine a prioritized radio for a current time period in a sequence of time periods, wherein each time period in the sequence of time periods has an associated prioritized radio; and generate the response to the request to perform the operation based on the prioritized radio for the current time period.

(Feature 31) The communication interface component of any of features 30, wherein the coexistence coordinator is configured to: update at least one characteristic of a future time period (e.g., based on (1) an indication of a received signal strength of a wireless signal received via the first radio and/or the second radio, (2) an indication of a spacing between at least one first antenna associated with the first radio and at least one second antenna associated with the second radio, (3) an indication of a duty cycle of the one radio, (4) a communication protocol to be employed in the operation, (5) power level associated with the operation, and/or (6) priority of the operation).

(Feature 32) The communication interface component of any of features 31, wherein the at least one characteristics of the future time period comprises a duration of the future time period and/or the radio that is prioritized during the future time period.

(Feature 33) The communication interface component of any of features 21-32, wherein the first radio comprises a first radio circuit, the second radio comprises a second radio circuit, and the coexistence coordinator comprises a coexistence coordinator circuit.

(Feature 34) The communication interface component of feature 33, further comprising a substrate (e.g., a semiconductor substrate) and wherein at least one of: (1) the first radio circuit, (2) the second radio circuit, or (3) the coexistence coordinator circuit is disposed on (e.g., formed on) the substrate.

(Feature 35) The communication interface component of any of features 21-34, wherein the response comprises an indication of whether the operation in the request from the at least one of the first radio or the second radio is allowed or disallowed (e.g., granted or denied).

(Feature 36) The communication interface component of any of features 21-35, wherein the plurality of radios comprises at least two of: a BLUETOOTH radio, a ZIGBEE radio, an Ultra-Wideband (UWB) radio, or a WIFI radio.

(Feature 37) The communication interface component of any of features 21-36, wherein the plurality of radios further comprises a third radio configured to facilitate wireless communication in a third frequency range using at least one third communication protocol, wherein the third frequency range at least partially overlaps with each of the first frequency range and the second frequency range, and wherein the at least one third communication protocol is different from each of the at least one first communication protocol and the at least one second communication protocol.

(Feature 38) The communication interface component of any of features 21-37, wherein the plurality of radios comprises at least one radio configured to facilitate wireless communication in another frequency range that is non-overlapping with the first and second frequency ranges.

(Feature 39) The communication interface component of any of features 21-38, wherein the coexistence coordinator is configured to: provide the response to the one of the plurality of wireless radios.

(Feature 40) The communication interface component of any of features 21-39, wherein the request to perform the operation further comprises the at least one parameter.

(Feature 41) A circuit board assembly comprising: at least one circuit board; a communication interface component (e.g., as described in any of features 21-39) disposed on (e.g., mounted or otherwise attached to) the at least one circuit board; a first antenna terminal disposed on (e.g., mounted or otherwise attached to) the at least one circuit board, wherein the first antenna termina is coupled to the communication interface component and configured to couple to a first antenna; and a second antenna terminal disposed on (e.g., mounted or otherwise attached to) the at least one circuit board, wherein the second antenna terminal is coupled to the communication interface component and configured to couple to a second antenna.

(Feature 42) The circuit board assembly of feature 41, further comprising: at least one front-end circuit disposed on (e.g., mounted or otherwise attached to) the at least one circuit board, wherein the at least one front-end circuit is coupled between the first antenna terminal and the communication interface component.

(Feature 43) A playback device comprising: a communication interface component (e.g., as described in any of features 21-40); an audio amplifier; at least one processor; at least one non-transitory computer-readable medium comprising program instructions that are executable by the at least one processor such that the playback device is configured to: receive, using the communication interface component, audio content; play back, using the audio amplifier, the audio content.

(Feature 44) The playback device of feature 43, wherein the at least one non-transitory computer-readable medium further comprises program instructions that are executable by the at least one processor such that the playback device is configured to: transmit, using the communication interface component, at least some of the audio content to another playback device.

(Feature 45) A playback device comprising: a communication interface component (e.g., as described in any of features 21-40); an audio amplifier; at least one processor; at least one non-transitory computer-readable medium comprising program instructions that are executable by the at least one processor such that the playback device is configured to: receive, using the first radio of the communication interface component, audio content; transmit, using the second radio of the communication interface component, at least some of the audio content to another playback device; and play back, using the audio amplifier, the audio content in synchrony with the other playback device.

(Feature 46) A playback device comprising: a communication interface comprising a plurality of wireless radios comprising a first radio to facilitate wireless communication in a first frequency range, and a second radio to facilitate wireless communication in a second frequency range that at least partially overlaps with the first frequency range, the communication interface being configured to after a determination that an operation is to be performed by one radio from the plurality of wireless radios, obtain at least one parameter, the at least one parameter comprising one or more of an indication of a received signal strength of a wireless signal received via the first radio and/or the second radio, an indication of a spacing between at least one first antenna associated with the first radio and at least one second antenna associated with the second radio, an indication of a duty cycle of the one radio, an indication of a communication protocol to be used in the operation, an indication of a power level associated with the operation, or an indication of a priority of the operation, and determine whether to allow the one radio to perform the operation based on the at least one parameter; an audio amplifier; at least one processor; and at least one non-transitory computer-readable medium comprising program instructions that are executable by the at least one processor such that the playback device is configured to: while receiving a first data stream comprising audio content via the first radio, play back the audio content using the audio amplifier; generate a second data stream based on the audio content; and transmit the second data stream via the second radio to at least one external device.

(Feature 47) The playback device of feature 46, wherein: the playback device is a first playback device; the at least one external device comprises a second playback device; and to play back comprises to play back the audio content in synchrony with playback of the audio content by the second playback device.

(Feature 48) The playback device of feature 47, wherein: the audio content comprises one or more audio channels; and to play back comprises to play back all of the one or more audio channels in synchrony with playback of all of the one or more audio channels by the second playback device.

(Feature 49) The playback device of either of features 47 or 48, wherein: the audio content is multi-channel audio content comprising a plurality of audio channels; and to play back comprises to play back a first subset of the plurality of audio channels in synchrony with playback of a second subset of the plurality of audio channels by the second playback device, the second subset of the plurality of audio channels being non-overlapping with the first subset of the plurality of audio channels.

(Feature 50) The playback device of feature 49, wherein: the multi-channel audio content is stereo audio content comprising a first audio channel and a second audio channel; and to play back comprises to play back the first audio channel in synchrony with playback of the second audio channel by the second playback device.

(Feature 51) The playback device of any of features 46-50, wherein: the operation is a first operation; and the communication interface is configured to determine whether at least one of the plurality of wireless radios is to perform a second operation.

(Feature 52) The playback device of feature 51, wherein to determine whether to allow the one radio to perform the operation comprises to determine whether the at least one of the plurality of wireless radios is to perform the second operation.

(Feature 53) The playback device of either of features 51 or 52, wherein the communication interface is configured to determine, after a determination that the at least one of the plurality of wireless radios is to perform the second operation, at least one characteristic associated with the second operation.

(Feature 54) The playback device of feature 53, wherein to determine whether to allow the one radio to perform the operation comprises to determine the at least one characteristic associated with the second operation.

(Feature 55) The playback device of any of features 46-54, wherein to determine whether to allow the one radio to perform the operation comprises to determine a prioritized radio for a current time period in a sequence of time periods, each time period in the sequence of time periods having an associated prioritized radio.

(Feature 56) The playback device of an of features 46-55, wherein the plurality of wireless radios comprises two or more of a BLUETOOTH radio, a ZIGBEE radio, a WIFI radio, or an Ultra-Wideband radio.

(Feature 57) A method of operating a playback device comprising a plurality of wireless radios comprising a first radio to facilitate wireless communication in a first frequency range and a second radio to facilitate wireless communication in a second frequency range that at least partially overlaps with the first frequency range, the method comprising: after determining that an operation is to be performed by one radio of the first radio and the second radio, obtaining at least one parameter comprising one or more of an indication of a received signal strength of a wireless signal received via the first radio and/or the second radio, an indication of a spacing between at least one first antenna associated with the first radio and at least one second antenna associated with the second radio, an indication of a duty cycle of the one radio, an indication of a communication protocol to be used in the operation, an indication of a power level associated with the operation, or an indication of a priority of the operation; determining to allow the one radio to perform the operation based on the at least one parameter; and while receiving a first data stream comprising audio content via the first radio, playing back the audio content using the audio amplifier, generating a second data stream based on the audio content, and transmitting the second data stream via the second radio to at least one external device.

(Feature 58) The method of feature 57, wherein playing back comprises playing back the audio content in synchrony with playback of the audio content by the second playback device.

(Feature 59) The method of either features 57 or 58, further comprising determining that at least one of the plurality of wireless radios is to perform a second operation.

(Feature 60) The method of feature 59, wherein determining to allow the one radio to perform the operation comprises to determining that the at least one of the plurality of wireless radios is to perform the second operation.

(Feature 61) The method of either features 59 or 60, further comprising determining, after determining that the at least one of the plurality of wireless radios is to perform the second operation, at least one characteristic associated with the second operation.

(Feature 62) The method of feature 61, wherein determining to allow the one radio to perform the operation comprises determining the at least one characteristic associated with the second operation.

(Feature 63) The method of any of features 57-62, wherein determining to allow the one radio to perform the operation comprises determining a prioritized radio for a current time period in a sequence of time periods, each time period in the sequence of time periods having an associated prioritized radio.

(Feature 64) The method of an of features 57-63, wherein determining to allow the one radio to perform the operation comprises determining that the plurality of wireless radios comprises two or more of a BLUETOOTH radio, a ZIGBEE radio, a WIFI radio, or an Ultra-Wideband radio.

(Feature 65) A media playback system comprising: a first playback device; and a second playback device comprising a communication interface comprising a plurality of wireless radios comprising a first radio to facilitate wireless communication in a first frequency range, and a second radio to facilitate wireless communication in a second frequency range that at least partially overlaps with the first frequency range, the communication interface being configured to after a determination that an operation is to be performed by one radio from the plurality of wireless radios, obtain at least one parameter, the at least one parameter comprising one or more of an indication of a received signal strength of a wireless signal received via the first radio and/or the second radio, an indication of a spacing between at least one first antenna associated with the first radio and at least one second antenna associated with the second radio, an indication of a duty cycle of the one radio, an indication of a communication protocol to be used in the operation, an indication of a power level associated with the operation, or an indication of a priority of the operation, and determine whether to allow the one radio to perform the operation based on the at least one parameter, at least one processor, and at least one non-transitory computer-readable medium comprising program instructions that are executable by the at least one processor such that the second playback device is configured to while receiving a first data stream comprising audio content via the first radio, transmit a second data stream comprising the audio content via the second radio to the first playback device, and play back the audio content in synchrony with playback of the audio content by the first playback device.

(Feature 66) The playback device of feature 1, wherein the at least one parameter further comprises one or more of: an indication of a received signal strength of a wireless signal received via the first radio and/or the second radio; an indication of a spacing between at least one first antenna associated with the first radio and at least one second antenna associated with the second radio; an indication of a duty cycle of the one radio; an indication of a power level associated with the operation; or an indication of a priority of the operation.

(Feature 67) The method of feature 12, wherein determining to allow the one radio to perform the operation comprises determining to allow the one radio to perform the operation based on one or more of: an indication of a received signal strength of a wireless signal received via the first radio and/or the second radio; an indication of a spacing between at least one first antenna associated with the first radio and at least one second antenna associated with the second radio; an indication of a duty cycle of the one radio; an indication of a power level associated with the operation; or an indication of a priority of the operation.

(Feature 68) A playback device comprising: a communication interface comprising a plurality of wireless radios comprising a first radio to facilitate wireless communication in a first frequency range, and a second radio to facilitate wireless communication in a second frequency range that at least partially overlaps with the first frequency range, the communication interface being configured to after a determination that an operation is to be performed by one radio from the plurality of wireless radios, obtain at least one parameter, the at least one parameter comprising one or more of an indication of a received signal strength of a wireless signal received via the first radio and/or the second radio, an indication of a spacing between at least one first antenna associated with the first radio and at least one second antenna associated with the second radio, an indication of a duty cycle of the one radio, an indication of a communication protocol to be used in the operation, an indication of a power level associated with the operation, or an indication of a priority of the operation, an indication of an amount of isochronous data to communicate within an interval associated with the one radio, and determine whether to allow the one radio to perform the operation based on the at least one parameter; an audio amplifier; at least one processor; and at least one non-transitory computer-readable medium comprising program instructions that are executable by the at least one processor such that the playback device is configured to while receiving a first data stream comprising audio content via the first radio, play back the audio content using the audio amplifier; generate a second data stream based on the audio content; and transmit the second data stream via the second radio to at least one external device.

(Feature 69) The playback device of feature 68, wherein: the playback device is a first playback device; the at least one external device comprises a second playback device; and to play back comprises to play back the audio content in synchrony with playback of the audio content by the second playback device.

The invention claimed is:

1. A playback device comprising:
a communication interface comprising a plurality of wireless radios comprising
a first radio to facilitate wireless communication in a first frequency range, and
a second radio to facilitate wireless communication in a second frequency range that at least partially overlaps with the first frequency range, the communication interface being configured to
after a determination that an operation is to be performed by one radio from the plurality of wireless radios, obtain at least one parameter, the at least one parameter comprising an indication of a communication protocol to be used in the operation,
determine a priority radio from the first radio and the second radio with reference to an interval associated with the first radio or the second radio and an amount of isochronous data to communicate within the interval, and
determine whether to allow the one radio to perform the operation based on the at least one parameter and the priority radio;
an audio amplifier;
at least one processor; and
at least one non-transitory computer-readable medium comprising program instructions that are executable by the at least one processor such that the playback device is configured to
while receiving a first data stream comprising audio content via the first radio,
play back the audio content using the audio amplifier;
generate a second data stream based on the audio content; and
transmit the second data stream via the second radio to at least one external device.

2. The playback device of claim 1, wherein to determine the priority radio comprises to identify an active operating mode of the communication interface, the active operating mode prioritizing a WIFI radio over a BLUETOOTH radio.

3. The playback device of claim 2, wherein to determine whether to allow the one radio to perform the operation comprises to:
determine that the at least one parameter is an indication of a BLUETOOTH protocol; and
determine whether the operation is scheduled to be performed concurrently with a same operation of the WIFI radio.

4. The playback device of claim 2, wherein to determine whether to allow the one radio to perform the operation comprises to:
determine that the at least one parameter is an indication of a BLUETOOTH protocol;
determine that the operation is a transmit operation; and
determine whether the transmit operation is scheduled to be performed concurrently with a receive operation of the WIFI radio.

5. The playback device of claim 2, wherein to determine whether to allow the one radio to perform the operation comprises to:
determine that the at least one parameter is an indication of a BLUETOOTH protocol; and
determine that the operation is a receive operation.

6. The playback device of claim 1, wherein:
the playback device is a first playback device;
the at least one external device comprises a second playback device; and
to play back comprises to play back the audio content in synchrony with playback of the audio content by the second playback device.

7. The playback device of claim 6, wherein:
the audio content comprises one or more audio channels; and
to play back comprises to play back all of the one or more audio channels in synchrony with playback of all of the one or more audio channels by the second playback device.

8. The playback device of claim 6, wherein:
the audio content is multi-channel audio content comprising a plurality of audio channels; and
to play back comprises to play back a first subset of the plurality of audio channels in synchrony with playback of a second subset of the plurality of audio channels by the second playback device, the second subset of the plurality of audio channels being non-overlapping with the first subset of the plurality of audio channels.

9. The playback device of claim 8, wherein:
the multi-channel audio content is stereo audio content comprising a first audio channel and a second audio channel; and
to play back comprises to play back the first audio channel in synchrony with playback of the second audio channel by the second playback device.

10. The playback device of claim 1, wherein the program instructions that are executable by the at least one processor such that the playback device is configured to transmit a request to an access point to enter a power saving mode if the priority radio is a BLUETOOTH radio.

11. The playback device of claim 1, wherein the at least one parameter further comprises one or more of:
an indication of a received signal strength of a wireless signal received via the first radio and/or the second radio;
an indication of a spacing between at least one first antenna associated with the first radio and at least one second antenna associated with the second radio;
an indication of a duty cycle of the one radio;
an indication of a power level associated with the operation; or
an indication of a priority of the operation.

12. A method of operating a playback device comprising a plurality of wireless radios comprising a first radio to facilitate wireless communication in a first frequency range and a second radio to facilitate wireless communication in a second frequency range that at least partially overlaps with the first frequency range, the method comprising:
after determining that an operation is to be performed by one radio from the plurality of wireless radios, obtaining at least one parameter, the at least one parameter comprising an indication of a communication protocol to be used in the operation;

determining a priority radio from the first radio and the second radio with reference to an interval associated with the first radio or the second radio and an amount of isochronous data to communicate within the interval;

determining to allow the one radio to perform the operation based on the at least one parameter and the priority radio; and while receiving a first data stream comprising audio content via the first radio,
- playing back the audio content using an audio amplifier,
- generating a second data stream based on the audio content, and
- transmitting the second data stream via the second radio to at least one external device.

13. The method of claim 12, wherein determining the priority radio comprises identifying an active operating mode of a communication interface comprising the first radio and the second radio, the active operating mode prioritizing a WIFI radio over a BLUETOOTH radio.

14. The method of claim 13, wherein determining to allow the one radio to perform the operation comprises:
- determining that the at least one parameter is an indication of a BLUETOOTH protocol; and
- determining whether the operation is scheduled to be performed concurrently with a same operation of the WIFI radio.

15. The method of claim 13, wherein determining to allow the one radio to perform the operation comprises:
- determining that the at least one parameter is an indication of a BLUETOOTH protocol;
- determining that the operation is a transmit operation; and
- determining whether the transmit operation is scheduled to be performed concurrently with a receive operation of the WIFI radio.

16. The method of claim 13, wherein determining to allow the one radio to perform the operation comprises:
- determining that the at least one parameter is an indication of a BLUETOOTH protocol; and
- determining that the operation is a receive operation.

17. The method of claim 12, wherein playing back comprises playing back the audio content in synchrony with playback of the audio content by the at least one external device.

18. The method of claim 12, wherein determining to allow the one radio to perform the operation comprises determining to allow the one radio to perform the operation based on one or more of:
- an indication of a received signal strength of a wireless signal received via the first radio and/or the second radio;
- an indication of a spacing between at least one first antenna associated with the first radio and at least one second antenna associated with the second radio;
- an indication of a duty cycle of the one radio;
- an indication of a power level associated with the operation; or
- an indication of a priority of the operation.

* * * * *